(12) United States Patent
Yu et al.

(10) Patent No.: US 9,906,305 B2
(45) Date of Patent: Feb. 27, 2018

(54) QUADRATURE AMPLITUDE MODULATION (QAM) VECTOR SIGNAL GENERATION BY EXTERNAL MODULATOR

(71) Applicant: ZTE Corporation, Shenzhen (CN)

(72) Inventors: Jianjun Yu, Basking Ridge, NJ (US); Xinying Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/066,381

(22) Filed: Mar. 10, 2016

(65) Prior Publication Data

US 2016/0269122 A1 Sep. 15, 2016

Related U.S. Application Data

(60) Provisional application No. 62/131,808, filed on Mar. 11, 2015.

(51) Int. Cl.
| | |
|---|---|
| *H04B 10/54* | (2013.01) |
| *H04B 10/90* | (2013.01) |
| *H04B 10/2525* | (2013.01) |
| *H04B 10/572* | (2013.01) |
| *H04B 10/548* | (2013.01) |
| *H04B 10/2575* | (2013.01) |

(52) U.S. Cl.
CPC ....... *H04B 10/541* (2013.01); *H04B 10/2575* (2013.01); *H04B 10/548* (2013.01); *H04B 10/572* (2013.01); *H04B 10/90* (2013.01); *H04B 2210/006* (2013.01)

(58) Field of Classification Search
CPC .. H04B 10/541; H04B 10/2575; H04B 10/90; H04B 10/548; H04B 10/572; H04B 2210/006

See application file for complete search history.

(56) References Cited

U.S. PATENT DOCUMENTS

| 7,978,390 B2 * | 7/2011 | Kikuchi | G02F 1/225 359/238 |
|---|---|---|---|
| 2009/0067843 A1 * | 3/2009 | Way | H04B 10/506 398/79 |
| 2015/0020134 A1 * | 1/2015 | Bowler | H04N 21/2383 725/116 |
| 2016/0197642 A1 * | 7/2016 | Henry | H04B 3/52 375/256 |

OTHER PUBLICATIONS

Chen, L., et al., "A novel architecture for seamless integration of ROF with centralized lightwave WDM-PON network," Optical Fiber Communication Conference and National Fiber Optic Engineers Conference, OSA Technical Digest (CD) (Optical Society of America, 2009), San Diego, California United States, Paper OTuJ5, 3 pages, Mar. 2009.

(Continued)

*Primary Examiner* — Leslie Pascal

(74) *Attorney, Agent, or Firm* — Perkins Coie LLP

(57) ABSTRACT

An optical signal transmitter produces optical signals comprising QAM modulated vector signals generated using a single external electro-optical modulator operated in conjunction with a wavelength selective switch. The transmission processing achieves adaptive photonic frequency multiplication and comprises QAM modulated signals with high order constellations such as 8-QAM, 16-QAM, and 64-QAM.

22 Claims, 30 Drawing Sheets

(56) References Cited

OTHER PUBLICATIONS

Kanno, A., et al., "40 Gb/s W-band (75-110 GHz) 16-QAM radio-over-fiber signal generation and its wireless transmission," 37th European Conference and Exposition on Optical Communications, OSA Technical Digest (CD) (Optical Society of America, 2011), Geneva, Switzerland, Paper We.10.P1.112, 3 pages, Sep. 2011.

Kanno, A., et al., "Evaluation of Frequency Fluctuation in Fiber-Wireless Link with Direct IQ Down-Converter," 2014 The European Conference on Optical Communication (ECOC), Cannes, France, Paper We.3.6.3, 3 pages, Sep. 2014.

Kitayama, K., et al., "Digital Coherent Technology for Optical Fiber and Radio-Over-fiber Transmission Systems," Journal of Lightwave Technology, 32(20):3411-3420, Oct. 2014.

Leven, A., et al., "Frequency Estimation in Intradyne Reception," IEEE Photonics Technology Letters, 19(6):366-368, Mar. 2007.

Li, W., et al., "Microwave Generation Based on Optical Domain Microwave Frequency Octupling," IEEE Photonics Technology Letters, 22(1):24-26, Jan. 2010.

Lin, C.-T., et al., "Photonic vector signal generation at microwave/millimeter-wave bands employing an optical frequency quadrupling scheme," Optics Letters, 34(14):2171-2173, Jul. 2009.

Pang, X., et al., "100 Gbit/s hybrid optical fiber-wireless link in the W-band (75-110 GHz)," Optics Express, 19(25):24944-24949, Dec. 2011.

Wang, X., et al., "SSBI mitigation at 60GHz OFDM-ROF system based on optimization of training sequence," Optics Express, 19(9):8839-8846, Apr. 2011.

Yu, J., et al., "Centralized Lightwave Radio-Over-Fiber System With Photonic Frequency Quadrupling for High-Frequency Millimeter-Wave Generation," IEEE Photonics Technology Letters, 19(19):1499-1501, Oct. 2007.

Yu, J., et al., "Optical Millimeter-Wave Generation or Up-Conversion Using External Modulators," IEEE Photonics Technology Letters, 18(1):265-267, Jan. 2006.

\* cited by examiner

QUADRATURE AMPLITUDE MODULATION (QAM) VECTOR SIGNAL GENERATION BY EXTERNAL MODULATOR

CROSS REFERENCE TO RELATED APPLICATIONS

This patent document claims the benefit of priority of U.S. Provisional Patent Application No. 62/131,808, filed Mar. 11, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, among other things, techniques for generating modulated optical signals in which photonic frequency multiplexing is achieved by using a single external modulator to process a QAM (Quadrature Amplitude Modulation) vector signal in which high order QAM constellations are used.

In one example aspect, a method of optical communication implemented at a transmitter in an optical communication network, includes combining a first quadrature amplitude modulation (QAM) modulated signal carrying a first portion of data to be transmitted and a second QAM modulated signal carrying remaining portion of data to be transmitted to generate a precoded vector signal, feeding the precoded vector to an electro-optical modulator in form of a photonic vector signal to produce an intermediate modulated optical signal, and processing the intermediate modulated optical signal through a wavelength selective switch (WSS) to generate a frequency multiplied optical signal for transmission.

In another example aspect, an optical transmission apparatus includes a signal combiner that combines a first quadrature amplitude modulation (QAM) modulated signal carrying a first portion of data to be transmitted and a second QAM modulated signal carrying remaining portion of data to be transmitted to generate a precoded vector signal, an electro-optical modulator that receives the precoded vector in form of a photonic vector signal to produce an intermediate modulated optical signal, and a wavelength selective switch (WSS) that processes the intermediate modulated optical signal to generate a frequency multiplied optical signal for transmission.

These and other aspects, and their implementations and variations are set forth in the drawings, the description and the claims.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively or in addition, data modulation can also be achieved in the optical domain, e.g., using photonic signal processing.

Figure 1:
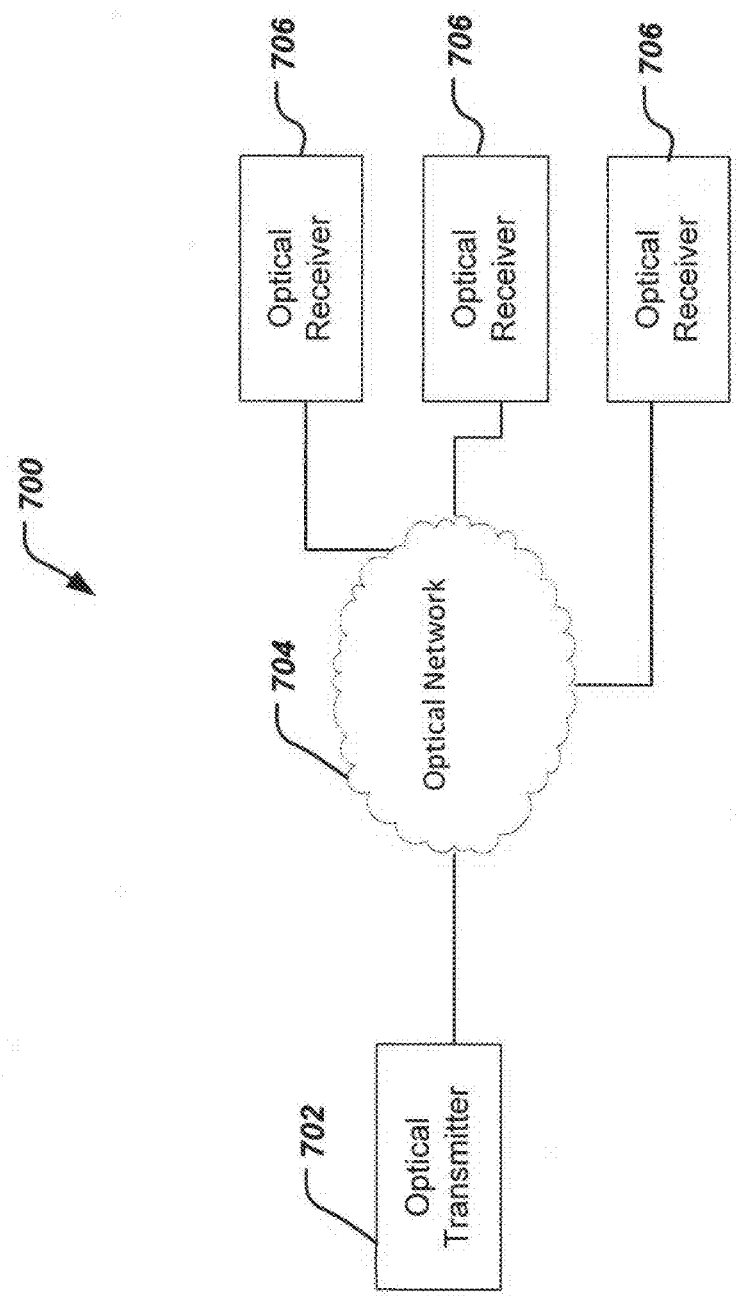
FIG. 1 shows an example optical communication network.

FIG. 1 depicts an optical communication system 700 in which the presently disclosed technology can be embodied. One or more optical transmitters 702 are communicatively coupled via an optical network 704 with one or more optical receivers 706. The optical network 704 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

In implementations that achieve data modulation using at least some processing in the optical domain, e.g., using intensity and/or phase of optical signals, a variety of operational channels have to be overcome to be able to achieve high data throughput. Various techniques have been disclosed herein for generating modulated optical signals, e.g., quadrature amplitude modulation (QAM) optical signals.

In some disclosed embodiments, photonic QAM vector signal generation at microwave/millimeter-wave (mm-wave) bands is enabled by a single Mach-Zehnder modulator (MZM) or a phase modulator and a phase-precoding technique, which can realize adaptive photonic frequency multiplication, such as doubling (×2), quadrupling (×4), sextupling (×6) and octupling (×8), of the precoded microwave vector signal used for the drive of the single MZM or optical phase modulator.

In a photonic vector modulator, two optical carriers are modulated with two independent baseband data streams I and Q. The two optical signals can either be of the same source divided into two streams, or two different lasers, and the data modulation can be either direct current modulation of the lasers such as distributed feedback lasers (DFB) or external modulation using electro-optical modulators like Mach-Zehnder modulators (MZM).

In this document, headers are used for clarity of explanation are not intended to limit scope of the techniques to the header-captioned category only.

QPSK Vector Signal Generation with Frequency Multiplexing Based on Single MZM

Due to inherent wider bandwidth available at higher frequencies, wireless delivery in millimeter-wave (mm-wave) frequency bands is expected to provide multi-gigabit mobile data transmission, and has been intensively studied in the research community. It is well known that it is challenging to generate broadband mm-wave electrical signals based on bandwidth-limited electrical components. A more attractive solution for broadband mm-wave signal generation is to use photonic techniques, which can also effectively promote the seamless integration of wireless and fiber-optic networks. Both remote heterodyning and external intensity modulation are widespread photonic mm-wave generation techniques. Remote heterodyning, which is typically enabled by the beating of two free-running lightwaves in a photodiode (PD), is simple and cost effective, but the generated mm-wave frequency is not stable due to unlocked frequency and may not be applicable in some special cases. For example, the accepted frequency deviation at 120 GHz in Japan is only ~24 MHz.

External intensity modulation, which makes use of the beating of the sidebands generated by external intensity modulator driven by a radio-frequency (RF) signal, can offer very stable mm-wave carrier, the frequency of which only depends on the RF signal. However, due to the bandwidth limitation of the available RF signal and optical components, in many cases, external intensity modulation has to be combined with the technique of frequency multiplication to realize high-frequency mm-wave signal generation. Frequency doubling, tripling, and even to octupling can be achieved based on single/multiple modulators. This can greatly reduce the bandwidth requirement for both optical and electrical components at the transmitter end. Besides, vector signal modulation can be well combined with digital coherent detection and efficiently improve spectral efficiency and receiver sensitivity.

In some embodiments, photonic vector signal generation at microwave/mm-wave bands can be performed by employing optical frequency quadrupling and precoding techniques. However, conventional techniques use a dual-parallel Mach-Zehnder modulator (MZM). This additional complexity leads to a relatively small optical signal-to-noise ratio (OSNR) due to the insertion loss of the dual-parallel MZM and a relatively weak stability due to the simultaneous control of three different biases. Also, a dual-parallel MZM is much more expensive relative to a single intensity modulator. Some disclosed embodiments realize higher-frequency vector signal generation based on only one modulator with a simple architecture (no cascaded or dual-parallel modulators), and thus can prove to have a high stability and a low cost.

Some disclosed embodiments perform photonic vector signal generation at microwave/mm-wave bands enabled by a single MZM, which can realize adaptive photonic frequency multiplication, such as doubling (×2), quadrupling (×4), sextupling (×6) and octupling (×8), of the microwave vector signal used for the drive of the single MZM. In order to attain higher-frequency quadrature-phase-shift-keying (QPSK) modulated electrical vector signal after adaptive photonic frequency multiplication, phase-precoding is used for the driving vector signal. We also experimentally demonstrate photonic QPSK-modulated vector signal generation at W-band adopting photonic frequency octupling (×8). In some embodiments, the MZM is driven by a 12-GHz QPSK modulated precoded vector signal. The generated 4-Gbaud QPSK-modulated electrical vector signal at 96 GHz can realize 3-m wireless delivery.

Figure 2:
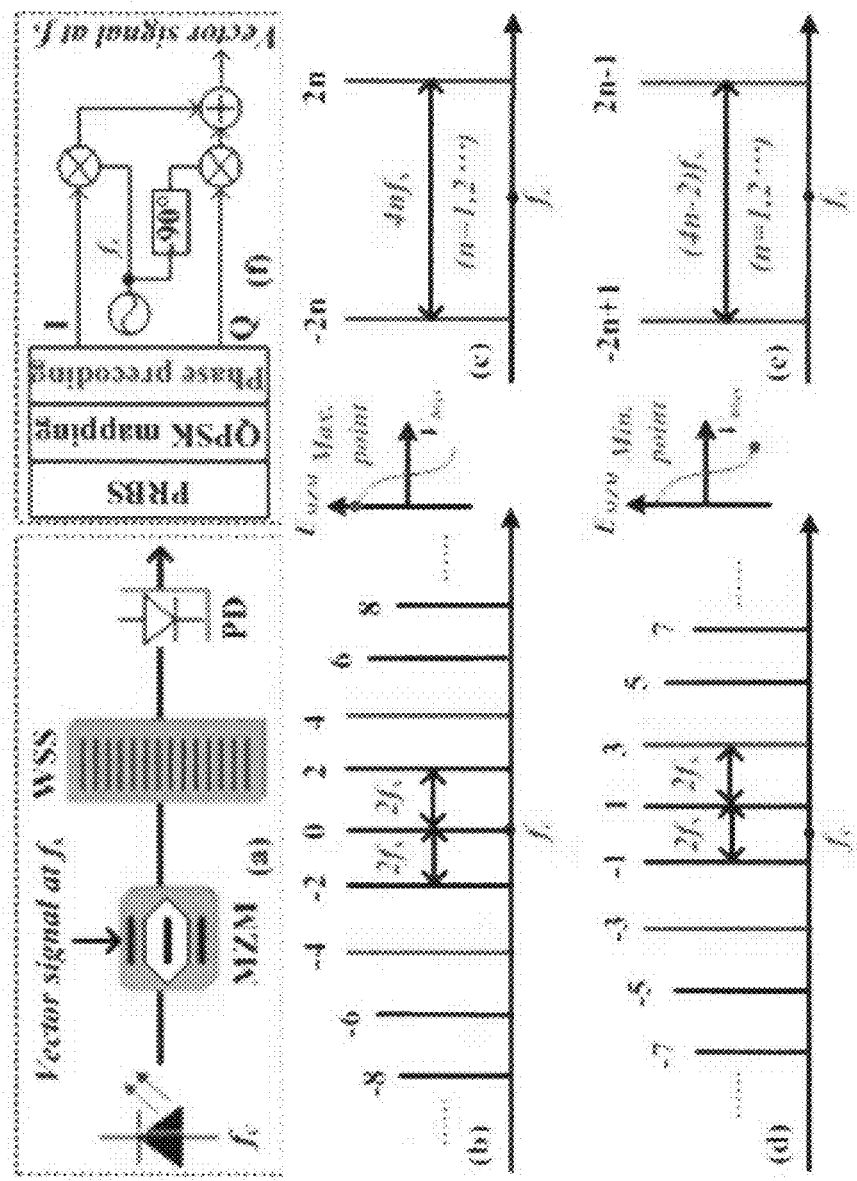
FIG. 2 shows an example schematic diagram of photonic vector signal generation at microwave/mm-wave bands. (b) and (c): The output optical spectra of MZM and WSS when MZM is biased at the maximum transmission point. (d) and (e): The output optical spectra of MZM and WSS when MZM is biased at the minimum transmission point. (f) Generation procedure of QPSK modulated precoded vector signal at $f_s$.

FIG. 2 shows an example configuration for photonic vector signal generation at microwave/mm-wave bands, which adopts an adaptive photonic frequency multiplication scheme and is enabled by a single MZM. As shown in FIG. 2, a continuous-wavelength (CW) lightwave at $f_c$ from a laser is modulated by an amplitude-constant electrical vector signal at $f_s$ with the aid of a single MZM. The single MZM may be biased at the maximum transmission point. Assume that the CW lightwave at fc and the electrical vector signal at $f_s$ can be respectively expressed as:

$$E_{laser}(t) = K_1 \exp(j2\pi f_c t) \qquad \text{Eq. (1)}$$

$$E_{driver}(t) = K_2 \sin[2\pi f_s t + \varphi(t)]. \qquad \text{Eq. (2)}$$

where $K_1$ and $f_c$ denote the amplitude and carrier frequency of the CW lightwave at $f_c$, respectively. $K_2$, $f_s$ and $\varphi$ denote the amplitude, center frequency and phase information of the electrical vector signal at $f_s$, respectively. Both $K_1$ and $K_2$ are constant. Therefore, the generated optical vector signal from the single MZM can be expressed as:

$$\begin{aligned} E_{MZM}(t) &= K_1 \exp(j2\pi f_c t)\exp\{j\kappa\sin[2\pi f_s t + \varphi(t)]\} + \\ &\quad K_1 \exp(j2\pi f_c t)\exp\{-j\kappa\sin[2\pi f_s t + \varphi(t)]\} \\ &= K_1 \sum_{n=-\infty}^{\infty} J_n(\kappa)\exp[j2\pi(f_c + nf_s)t + jn\varphi(t)] + \\ &\quad K_1 \sum_{n=-\infty}^{\infty} J_n(-\kappa)\exp[j2\pi(f_c + nf_s)t + jn\varphi(t)] \\ &= 2K_1 \sum_{n=-\infty}^{\infty} J_{2n}(\kappa)\exp[j2\pi(f_c + 2nf_s)t + j2n\varphi(t)]. \end{aligned} \qquad \text{Eq. (3)}$$

where $J_n$ is the first kind Bessel function of order n, and $\kappa=K_2\pi$ is the modulation index of the MZM. Eq. 3 shows that only even-order optical subcarriers spaced by 2 $f_s$ are generated by the MZM biased at the maximum transmission point, as shown in FIG. 2(b).

FIG. 2(a) shows an example schematic diagram of photonic vector signal generation at microwave/mm-wave bands. FIG. 2(b) and FIG. 2(c) show example output optical spectra of MZM and WSS when MZM is biased at the maximum transmission point. FIG. 2(d) and FIG. 2(e) show example output optical spectra of MZM and WSS when MZM is biased at the minimum transmission point. FIG. 2(f) shows an example generation procedure of QPSK (Quadrature phase shift keying) modulated precoded vector signal at $f_s$.

A subsequent optical filter, e.g., a wavelength selective switch (WSS) is used to select two optical subcarriers with the same order and a frequency spacing of 4 $nf_s$ (n=1, 2 ... ), as shown in FIG. 2(c), which can be expressed as:

$$E_{WSS}(t) = 2K_1 J_{2n}(\kappa)\{\exp[j2\pi(f_c+2nf_s)t+j2n\varphi(t)]+\exp[j2\pi(f_c-2nf_s)t-j2n\varphi(t)]\}, (n=1,2 \ldots). \qquad \text{Eq. (4)}$$

Then, the electrical RF signal after square-law PD detection can be expressed as:

$$i_{RF}(t)=\tfrac{1}{2}RJ_{2n}^2(\kappa)\cos[2\pi\cdot 4nf_s t+4n\varphi(t)], (n=1,2\ldots). \qquad \text{Eq. (5)}$$

where R denotes the PD sensitivity. The frequency 4 $nf_s$ of the generated RF signal is 4 n times that of the driving vector signal ($f_s$).

Similarly, if the single MZM is biased at the minimum transmission point, the output optical field of the MZM can be expressed as:

$$\begin{aligned} E_{MZM'}(t) &= K_1\exp(j2\pi f_c t)\exp\left\{j\kappa\sin[2\pi f_s t + \varphi(t)] + j\tfrac{\pi}{2}\right\} + \\ &\quad K_1\exp(j2\pi f_c t)\exp\left\{-j\kappa\sin[2\pi f_s t + \varphi(t)] - j\tfrac{\pi}{2}\right\} \\ &= jK_1 \sum_{n=-\infty}^{\infty} J_n(\kappa)\exp[j2\pi(f_c + nf_s)t + jn\varphi(t)] - \\ &\quad jK_1 \sum_{n=-\infty}^{\infty} J_n(-\kappa)\exp[j2\pi(f_c + nf_s)t + jn\varphi(t)] \\ &= 2jK_1 \sum_{n=-\infty}^{\infty} J_{2n-1}(\kappa)\exp\{j2\pi[f_c + (2n-1)f_s]t + \\ &\quad j(2n-1)\varphi(t)\}. \end{aligned} \qquad \text{Eq. (6)}$$

Eq. 6 shows that only odd-order optical subcarriers spaced by 2 $f_s$ are generated by the MZM biased at the minimum transmission point, as shown in FIG. 2(d). The subsequent WSS selects two optical subcarriers with the same order and a frequency spacing of $(4n-2)f_s$ (n= 1, 2 ... ), as shown in FIG. 2(e), which can be expressed as:

$$E_{WSS'}(t)=2jK_1 J_{2n-1}(\kappa)\{\exp[j2\pi(f_c+(2n-1)f_s)t+j(2n-1)\varphi(t)]-\exp[j2\pi(f_c-(2n-1)f_s)t-j(2n-1)\varphi(t)]\}, (n=1,2 \ldots). \qquad \text{Eq. (7)}$$

After square-law PD detection, the obtained electrical RF signal can be expressed as:

$$i_{RF'}(t)=\tfrac{1}{2}RJ_{2n-1}^2(\kappa)\cos[2\pi\cdot 2(2n-1)f_s t+2(2n-1)\varphi(t)], (n=1,2\ldots) \qquad \text{Eq. (8)}$$

The frequency $(4n-2)f_s$ of the generated RF signal is $(4n-2)$ times that of the driving vector signal ($f_s$). Therefore, in these embodiments, am implementor can realize adaptive photonic frequency multiplication, such as doubling (×2), quadrupling (×4), sextupling (×6) and octupling (×8) of the driving vector signal, and thus a lower-frequency microwave vector signal can be up-converted into a higher-frequency mm-wave vector signal by employing lower-bandwidth photonic and electronic components at the transmitter end. Meantime, the phase information of the generated RF signal is 2, 4, 6 and 8 times that of the driving vector signal for photonic frequency doubling (×2), quadrupling (×4), sextupling (×6) and octupling (×8), respectively. Therefore, the phase information $\varphi(t)$ of the driving vector signal needs to be precoded to obtain the desired vector signal after square-law PD detection.

Figure 4:
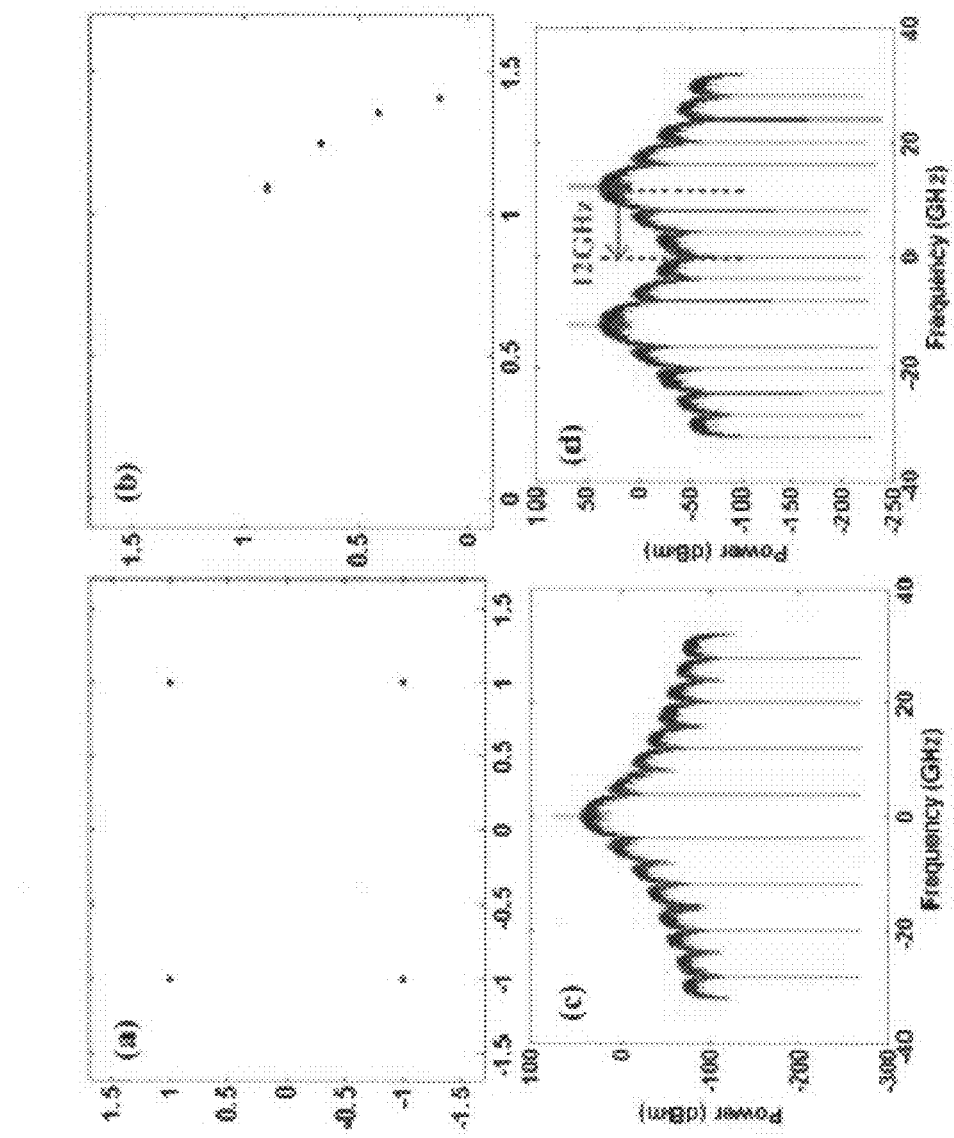
FIG. 4 shows example transmitter constellations: (a) before and (b) after phase-precoding. Transmitter spectra: (c) before and (d) after up-conversion.

FIG. 4 depicts example transmitter constellations: (a) before and (b) after phase-precoding. Transmitter spectra: (c) before and (d) after up-conversion.

Figure 5:
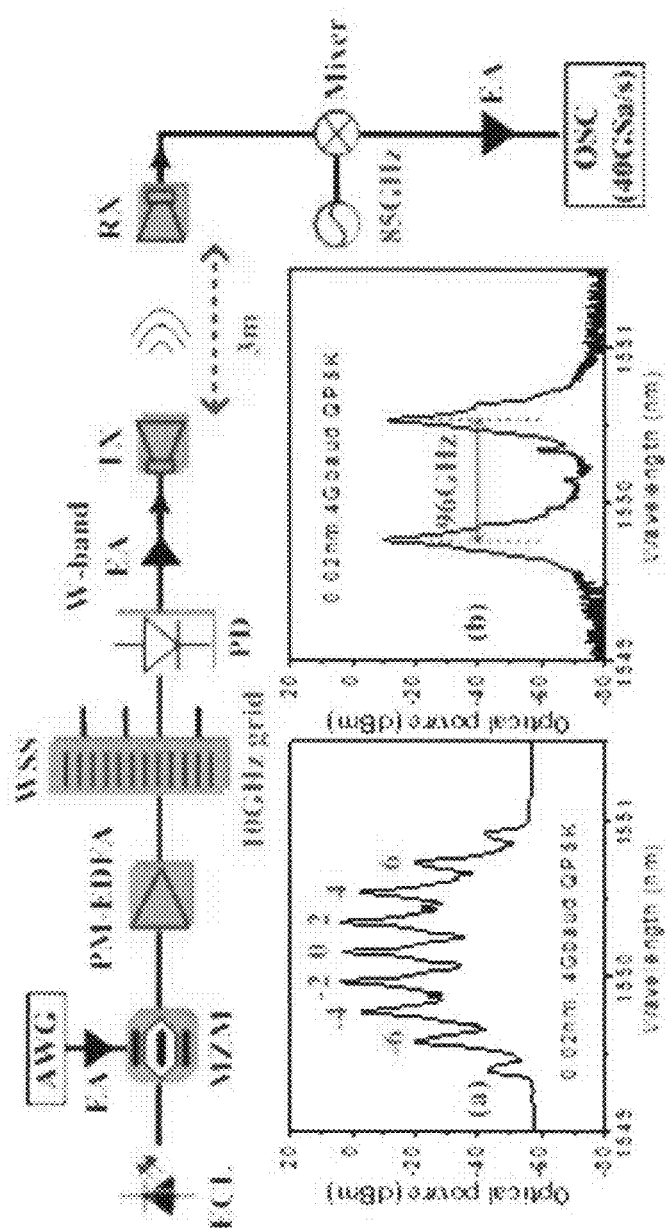
FIG. 5 shows an example experimental setup. Optical spectra (0.02-nm resolution): (a) After MZM; (b) after WSS.

FIG. 5 depicts an example Optical spectra (0.02-nm resolution): (a) After MZM; (b) after WSS.

FIG. 2(f) shows an example of a generation procedure of QPSK modulated precoded vector signal at fs. For testing, the procedure can be coded and implemented on a signal processing platform such as MATLAB. Here, the pseudo random binary sequence (PRBS) is first QPSK mapped, then phase-precoded, and finally up-converted into RF band by sinusoidal cosine and sine functions, to generate the QPSK modulated precoded vector signal at fs, which is uploaded into an arbitrary waveform generator (AMG) with 64-Gsa/s sampling rate in our experiment. Assume that the generated QPSK modulated precoded vector signal has a 12-GHz center frequency.

Figure 3:
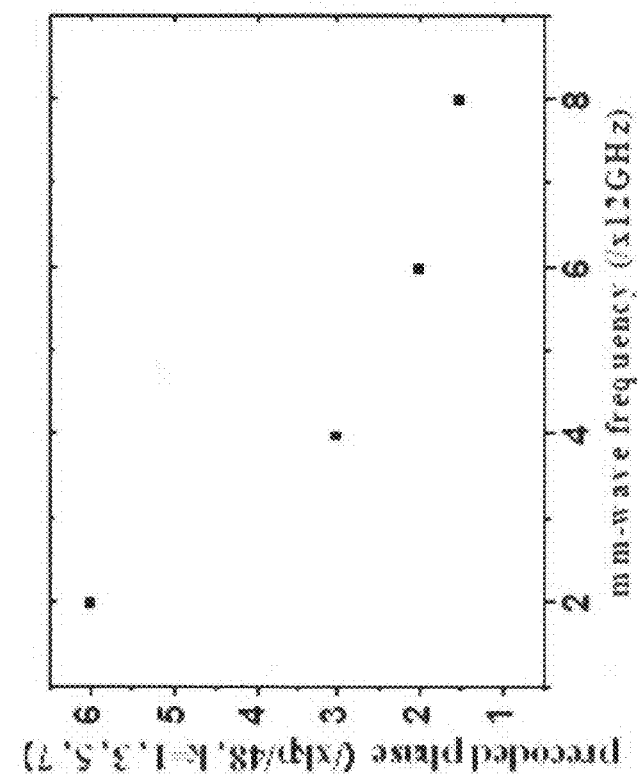
FIG. 3 shows an example of precoded phase information for photonic frequency doubling (×2), quadrupling (×4), sextupling (×6) and octupling (×8) of the 12-GHz driving vector signal.

FIG. 3 shows an example of the calculated precoded phase information for photonic frequency doubling (×2), quadrupling (×4), sextupling (×6) and octupling (×8) of the 12-GHz precoded vector signal, respectively. FIG. 3 shows that the precoded phase for photonic frequency doubling (×2), quadrupling (×4), sextupling (×6) and octupling (×8) is $½$, $¼$, $⅙$ and $⅛$ of the phase of the regular QPSK signal, respectively.

For the case of frequency octupling (×8), FIGS. 4(a) and 4(b) show an example of the transmitter constellations before and after phase-precoding, while FIGS. 4(c) and 4(d) show the transmitter spectra before and after up-conversion.

FIG. 5 shows an example embodiment for photonic QPSK-modulated vector signal generation at W-band adopting photonic frequency octupling (×8) based on our proposed scheme. The CW lightwave from an external cavity laser (ECL) is modulated by a 2/4/6.4-Gbaud QPSK modulated precoded vector signal at 12 GHz via a single MZM biased at the maximum transmission point. The precoded vector signal at 12 GHz from the AWG has a pattern length of $2^{12}$ and is boosted by an electrical amplifier (EA) to 29 dBm to drive the MZM. The MZM has 3-dB bandwidth of ~36 GHz, 2.8-V half-wave voltage $V_\pi$ and 5-dB insertion loss.

As shown in FIG. 5(a), only even-order optical subcarriers are generated with 24-GHz frequency spacing, which agrees with our aforementioned theoretical analysis. The subsequent polarization-maintaining erbium-doped fiber amplifier (PM-EDFA) is used to compensate for modulation loss and insertion loss. The two four-order optical subcarriers of the output optical spectrum of the MZM are selected by a programmable 1×4 WSS with a 10-GHz grid to generate 96-GHz optical vector signal, the optical spectrum of which is shown in FIG. 5(b). These two selected four-order optical subcarriers have the same amplitude but carry opposite phase information. The WSS has all C-band operation and 7-dB insertion loss.

The 96-GHz optical vector signal is converted into 96-GHz QPSK-modulated electrical vector signal via a PD. After boosted by a W-band EA with 30-dB gain and 3-dBm saturation output power, the generated 96-GHz electrical vector signal is sent into the air by a W-band horn antenna (HA), and received by another identical HA. The two HAs have a 3-m wireless distance as well as a high directionality. Each HA has a 25-dBi gain. The received 96-GHz QPSK-modulated electrical vector signal is first boosted by a W-band EA identical to the one at the transmitter end, and then down-converted in analog domain by an 85-GHz sinusoidal RF source and a commercial balanced mixer into an 11-GHz electrical intermediate-frequency (IF) signal. The 11-GHz electrical IF signal passes through a low-noise EA, and is then captured by a digital oscilloscope (OSC) with 40-GSa/s sampling rate and 16-GHz electrical bandwidth. The transmitter data can be recovered from the 11-GHz IF signal after offline digital signal processing (DSP), which includes IF down conversion, constant modulus algorithm (CMA) equalization, frequency offset estimation (FOE), carrier phase estimation (CPE) and bit-error-ratio (BER) calculation.

Figure 6:
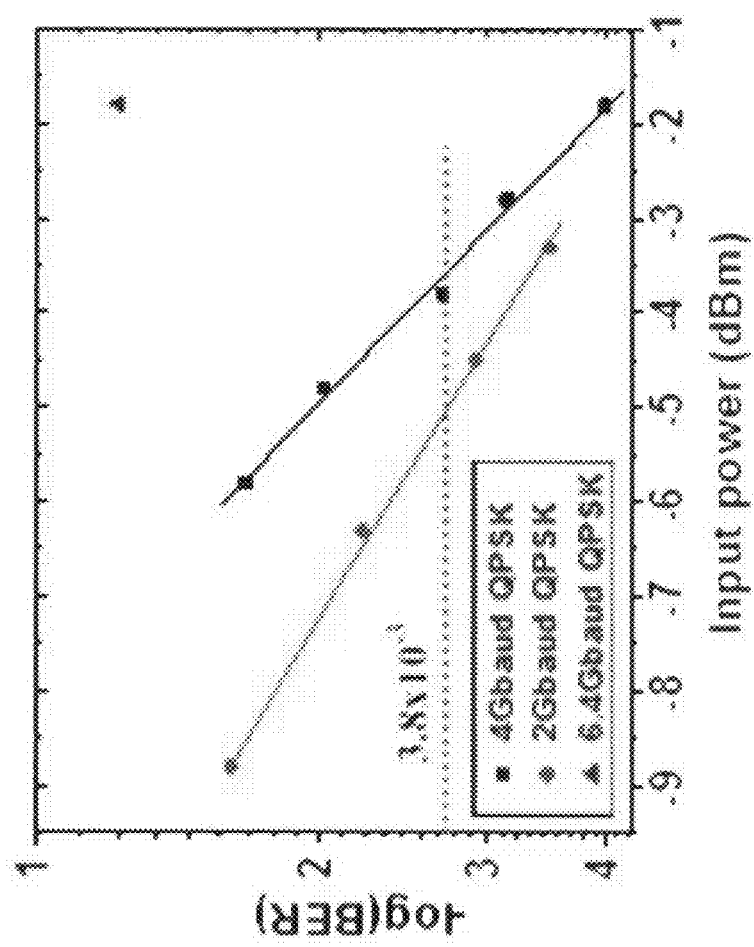
FIG. 6 shows an example measured BER versus the launched optical power into PD.

FIG. 6 shows an example of the measured BER versus the launched optical power into PD for 2-, 4- and 6.4-Gbaud QPSK-modulated vector signal at 96 GHz after 3-m wireless delivery. The BER can reach the hard-decision forward-error-correction (HD-FEC) threshold of $3.8×10^{-3}$ for both 2- and 4-Gbaud baud rates. The BER degradation for the 6.4-Gbaud baud rate is mainly due to the severe filtering effect of the 10-GHz WSS and limited carrier frequency at 12 GHz.

Figure 7:
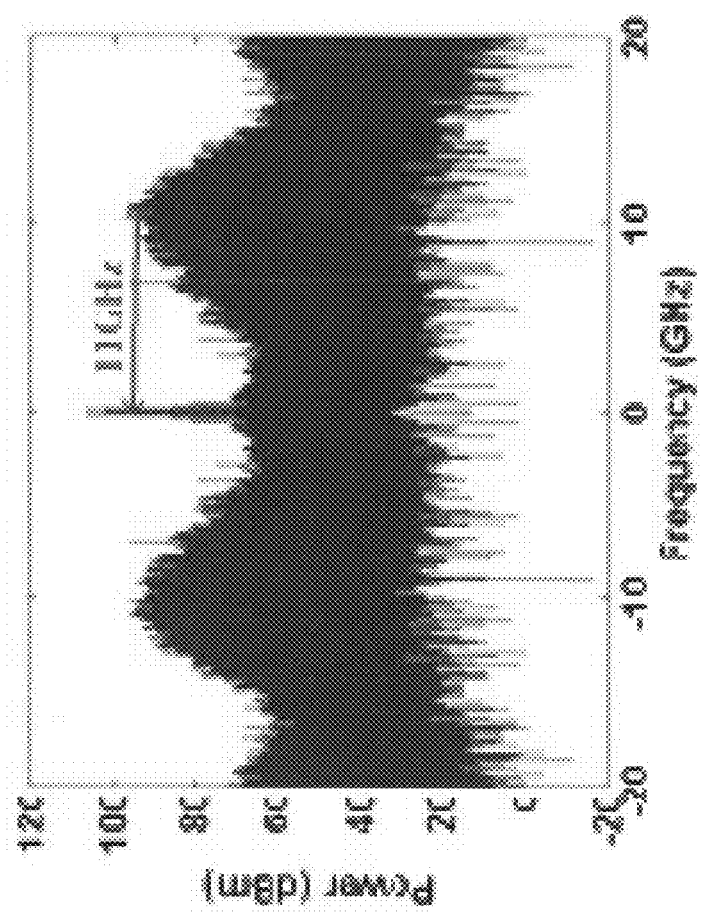
FIG. 7 shows an example 11-GHz IF spectrum after analog down conversion.

FIG. 7 shows an example of the generated 11-GHz IF spectrum for the 4-Gbaud QPSK-modulated vector signal at 96 GHz after 3-m wireless delivery.

Figure 8:
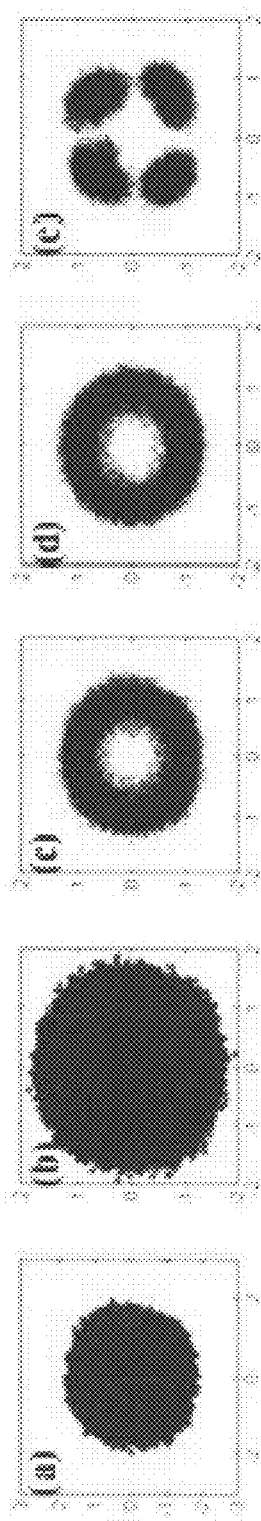
FIG. 8 shows an example of received QPSK constellations: (a) before clock extraction, (b) after clock extraction, (c) after CMA equalization, (d) after FOE and (e) after CPE.

FIGS. 8(a)-(e) show examples of the measured constellations before clock extraction, after clock extraction, after CMA equalization, after FOE and after CPE for the 4-Gbaud QPSK-modulated vector signal at 96 GHz after 3-m wireless delivery, respectively. The launched optical power into the PD is −1.8 dBm for both FIG. 7 and FIG. 8. In particular, FIG. 8(c) shows after CMA equalization, (d) after FOE and (e) after CPE.

8QAM Vector Signal Generation with Frequency Multiplexing Based on Single MZM

Some existing systems have demonstrated photonic vector signal generation at microwave/mm-wave bands employing photonic frequency quadrupling and precoding techniques. However, a dual-parallel Mach-Zehnder modulator (MZM) is used in such implementations, which leads to a relatively small optical signal-to-noise ratio (OSNR) due to the insertion loss of the dual-parallel MZM and a relatively weak stability due to the simultaneous control of three different biases. Also, a dual-parallel MZM is much more expensive relative to a single intensity modulator. Thus, it is interesting to investigate how to realize higher-frequency vector signal generation based on only one modulator with a simple architecture (no cascaded or dual-parallel modulators) and a high stability at lower cost.

This document discloses techniques for photonic multi-amplitude quadrature-amplitude-modulation (QAM) vector signal generation at microwave/mm-wave bands enabled by a single MZM combined with a wavelength selective switch (WSS), based on which, embodiments can derive adaptive photonic frequency multiplication. In order to attain an electrical mm-wave vector signal displaying multi-amplitude QAM modulation, such as 8QAM, the driving RF signal, carrying multi-amplitude QAM transmitter data, should be both amplitude- and phase-precoded before used to drive the MZM.

We experimentally demonstrate 8QAM vector signal generation at W-band adopting photonic frequency octupling enabled by our proposed scheme. The MZM is driven by a 12-GHz precoded RF signal carrying 1-Gbaud 8QAM transmitter data. The generated 1-Gbaud 8QAM vector signal at W-band is air transmitted over 2-m distance. It will be appreciated that the disclosed technique can be used to realize the generation and reception of multi-amplitude QAM vector signal by one external modulator at W-band.

I. Principle of Mm-Wave Multi-Amplitude QAM Vector Signal Generation

Figure 9:
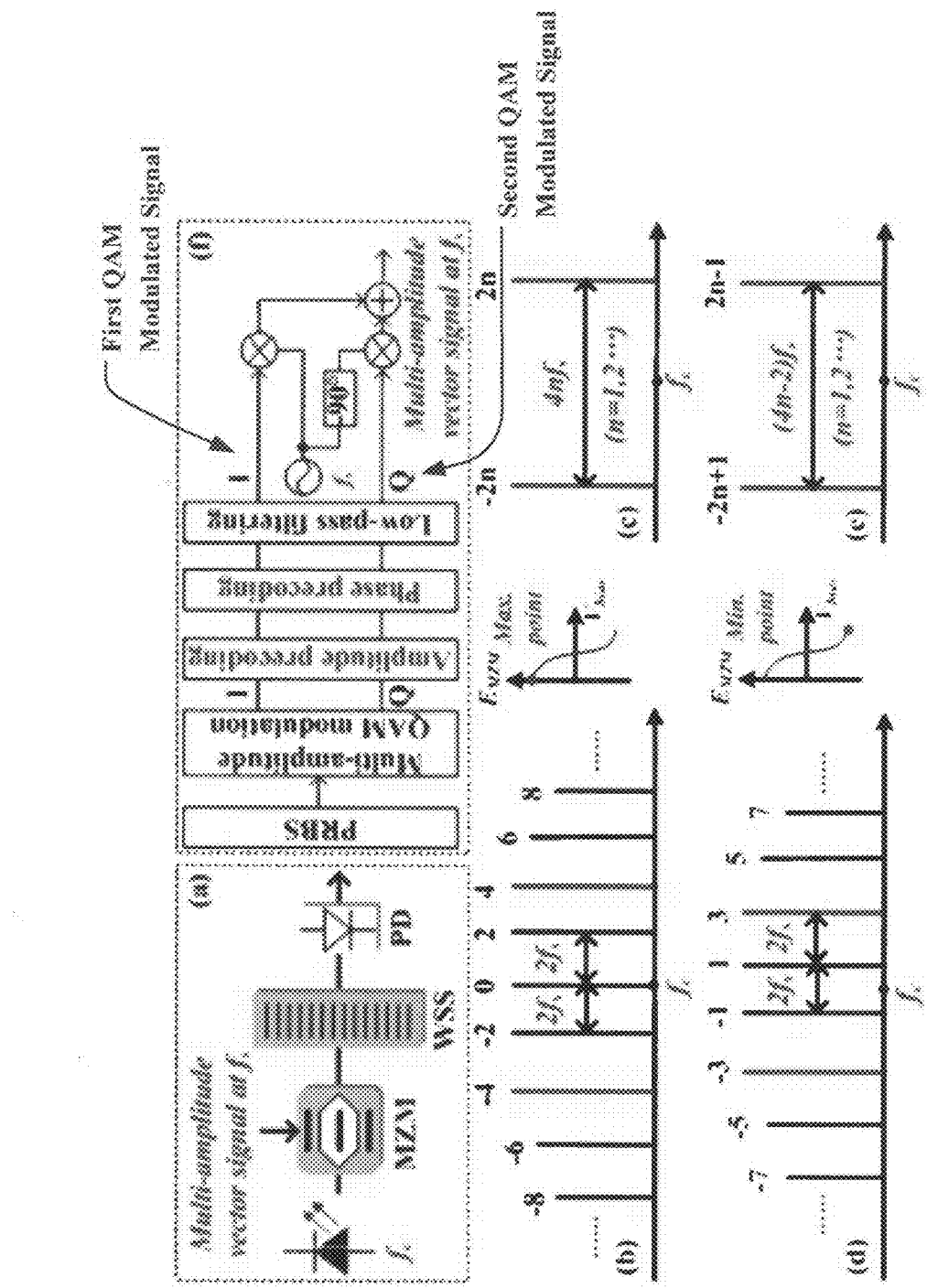
FIG. 9 shows examples of (a) Principle of photonic vector signal generation at microwave/mm-wave bands. (b) and (c): Output optical spectra of MZM and WSS when MZM biased at the maximum transmission point. (d) and (e): Output optical spectra of MZM and WSS when MZM biased at the minimum transmission point. (f) Vector-modulated precoded RF signal generation. MZM: Mach-Zehnder modulator, WSS: wavelength selective switch, PD: photodiode.

FIG. 9(a) depicts an example embodiment of photonic vector signal generation at microwave/mm-wave bands. (b) and (c): Output optical spectra of MZM and WSS when MZM biased at the maximum transmission point. (d) and (e): Output optical spectra of MZM and WSS when MZM biased at the minimum transmission point. (f) Vector-modulated precoded RF signal generation. MZM: Mach-Zehnder modulator, WSS: wavelength selective switch, PD: photodiode.

FIG. 9(a) shows the schematic diagram of our proposed photonic multi-amplitude QAM vector signal generation at microwave/mm-wave bands, using an adaptive photonic frequency multiplication scheme enabled by a single MZM combined with a WSS. As shown in FIG. 9(a), the continuous wave (CW) output, at frequency fc, from a laser, is modulated by an RF carrier at frequency fs, which carries a vector-modulated multi-amplitude QAM data and drives the MZM. Assume that the CW output at frequency fc and the driving RF signal at frequency fs can be respectively expressed as:

$$E_{CW}(t) = K_1 \exp(j2\pi f_c t). \quad \text{Eq. (9)}$$

$$E_{RF}(t) = K_2(t) \sin[2\pi f_s t + \varphi(t)] \quad \text{Eq. (10)}$$

where $K_1$ is constant and denotes the amplitude of the CW output at frequency $f_c$. $K_2$ and $\varphi$ denote the amplitude and phase of the driving RF signal at frequency $f_s$, respectively. $K_2$ is constant when the transmitter data adopts constant-amplitude vector modulation, such as quadrature-phase-shift-keying (QPSK), and has several different values when the transmitter data adopts multi-amplitude vector modulation, such as 8QAM. Thus, when the MZM is biased at its maximum transmission point, its output can be expressed as:

$$E_{MZM}(t) = K_1 \exp(j2\pi f_c t) \exp\{j\kappa \sin[2\pi f_s t + \varphi(t)]\} + \quad \text{Eq. (11)}$$
$$K_1 \exp(j2\pi f_c t) \exp\{-j\kappa \sin[2\pi f_s t + \varphi(t)]\}$$
$$= K_1 \sum_{n=-\infty}^{\infty} J_n(\kappa) \exp[j2\pi(f_c + nf_s)t + jn\varphi(t)] +$$
$$K_1 \sum_{n=-\infty}^{\infty} J_n(-\kappa) \exp[j2\pi(f_c + nf_s)t + jn\varphi(t)]$$
$$= 2K_1 \sum_{n=-\infty}^{\infty} J_{2n}(\kappa) \exp[j2\pi(f_c + 2nf_s)t + j2n\varphi(t)].$$

where Jn is the Bessel function of the first kind and order n. $\kappa$ is equal to $\pi V_{drive} K_2(t)/V_\pi$, while Vdrive and $V_\pi$ denote driving voltage and half-wave voltage of the MZM, respectively. We can see from Eq. (11) that only even-order optical subcarriers spaced by 2 fs are generated by the MZM biased at its maximum transmission point, as shown in FIG. 9(b). An optical filter, e.g., a WSS is used to select two optical subcarriers with the same order 2n and a frequency spacing 4 nfs (n=1, 2 . . . ), as shown in FIG. 9(c). The WSS output can be expressed as:

$$E_{WSS}(t) = 2K_1 J_{2n}(\kappa) \{\exp[j2\pi(f_c+2nf_s)t+j2n\varphi(t)] + \exp[j2\pi(f_c-2nf_s)t-j2n\varphi(t)]\}, (n=1,2\ldots). \quad \text{Eq. (12)}$$

obtained directly from Eq. (11). Upon heterodyne mixing in a PD, the leading term of the generated RF current is given by:

$$E_{MZM'}(t) = K_1 \exp(j2\pi f_c t) \exp\{j\kappa \sin[2\pi f_s t + \varphi(t)] + j\frac{\pi}{2}\} + \quad \text{Eq. (13)}$$
$$K_1 \exp(j2\pi f_c t) \exp\{-j\kappa \sin[2\pi f_s t + \varphi(t)] - j\frac{\pi}{2}\}$$
$$= jK_1 \sum_{n=-\infty}^{\infty} J_n(\kappa) \exp[j2\pi(f_c + nf_s)t + jn\varphi(t)] -$$
$$jK_1 \sum_{n=-\infty}^{\infty} J_n(-\kappa) \exp[j2\pi(f_c + nf_s)t + jn\varphi(t)]$$
$$= 2jK_1 \sum_{n=-\infty}^{\infty} J_{2n-1}(\kappa) \exp\{j2\pi[f_c + (2n-1)f_s]t + j(2n-1)\varphi(t)\}.$$

Eq. (13) shows that only odd-order optical subcarriers spaced by 2 $f_s$ are generated by the MZM biased at its minimum transmission point, as shown in FIG. 9(d). Thus, the WSS selects two optical subcarriers with the same order 2n−1 and a frequency spacing (4n−2)$f_s$ (n=1, 2 . . . ), as shown in FIG. 9(e). The WSS output is given by:

$$E_{WSS}(t) = 2jK_1 J_{2n-1}(\kappa)\{\exp[j2\pi(f_c+(2n-1)f_s)t+j(2n-1)\varphi(t)] - \exp[j2\pi(f_c-(2n-1)f_s)t-j(2n-1)\varphi(t)]\}, (n=1,2\ldots). \quad \text{Eq. (14)}$$

After square-law PD conversion, the system generates an electrical RF signal expressed as:

$$i_{RF}(t) = \frac{1}{2} R J_{2n-1}^2(\kappa) \cos[2\pi \cdot (4n-2)f_s t + (4n-2)\varphi(t)], (n=1,2\ldots) \quad \text{Eq. (15)}$$

Thus, embodiments can realize adaptive photonic frequency multiplication of the driving RF signal, and thus a lower-frequency microwave signal can be up-converted into a higher-frequency mm-wave signal by employing lower-bandwidth photonic and electronic components at the transmitter end. However, after square-law PD conversion, frequency multiplication also simultaneously leads to phase multiplication with the same multiplicative factor, by reference to the frequency and phase of the driving RF signal. Moreover, the amplitude information of the driving RF signal is carried by the term of the square of Jn($\kappa$), which depends on the order n of the selected optical subcarriers as well as the ratio of Vdrive to $V\pi$. In order to directly attain the amplitude information and phase information of the multi-amplitude QAM transmitter data after PD conversion, the amplitude K2 and phase $\varphi$ of the driving RF signal should satisfy:

$$K_{data} = J_n^2(\pi K_2 V_{drive}/V_\pi); \varphi_{data} = 2n\varphi, (n=1,2,3,4\ldots). \quad \text{Eq. (16)}$$

where $K_{data}$ and $\varphi_{data}$ denote the amplitude and phase of the transmitter data, respectively. The term n is the order of the selected optical subcarriers. Therefore, the amplitude and phase of the driving RF signal is to be precoded at the transmitter end. For a known multi-amplitude QAM transmitter data, the obtained values of $K_2$ and $\varphi$ by resolving Eq. (16) are just the precoded amplitude and phase which can be assigned to the driving RF signal. FIG. 9(f) shows the generation procedure of driving precoded RF signal at frequency $f_s$ carrying vector-modulated multi-amplitude QAM data, which can be implemented by MATLAB programming. Here, the pseudo random binary sequence (PRBS) (or data in general) is first multi-amplitude QAM modulated, then amplitude- and phase-precoded, and finally up-converted into RF band by simultaneous cosine and sine functions. When the transmitter data adopts constant-amplitude vector modulation, such as QPSK, only phase precoding is needed. However, when the transmitter data adopts multi-amplitude vector modulation, such as 8QAM, both phase and amplitude precoding are used.

Figure 10:
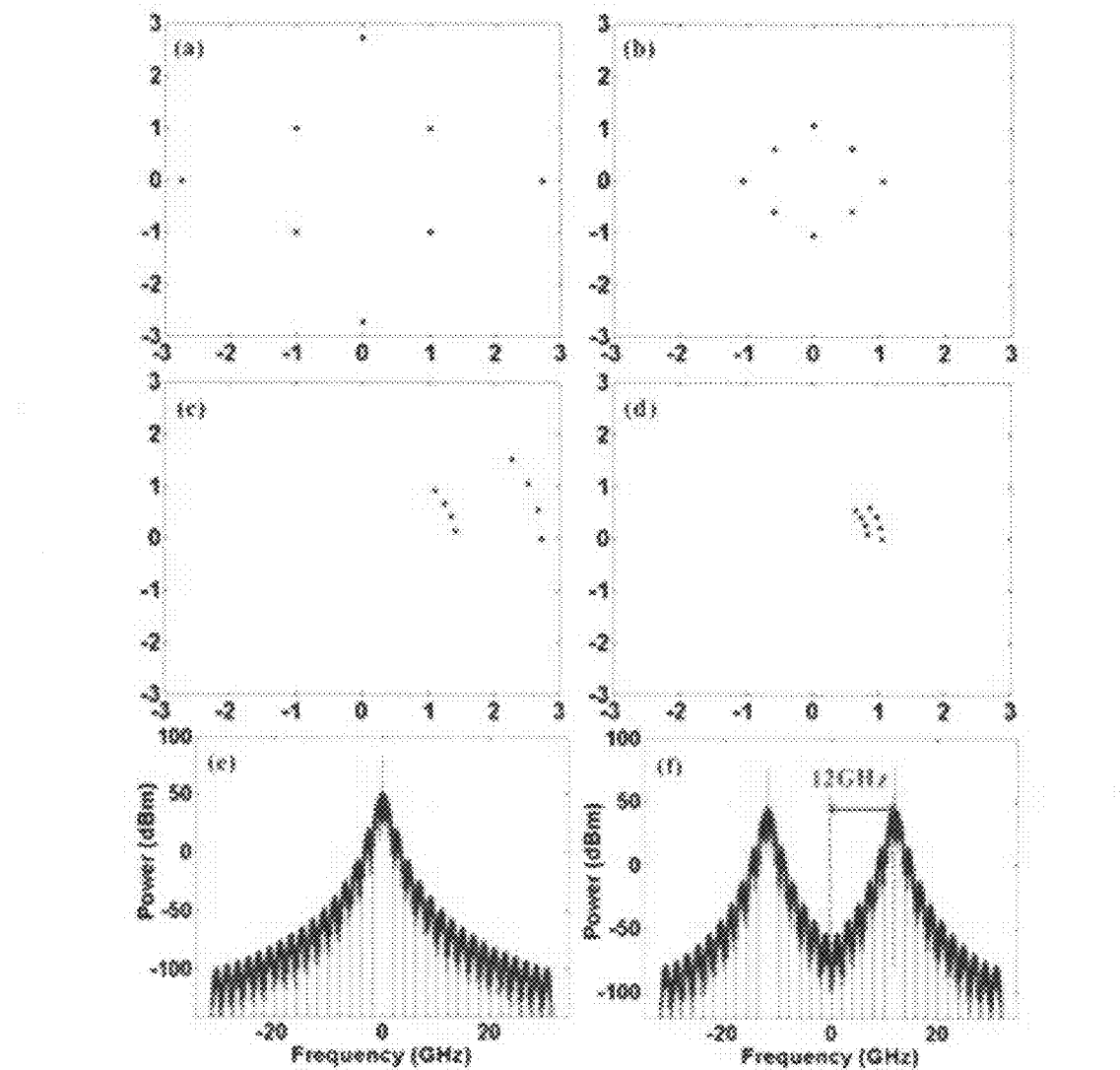
FIG. 10 shows example transmitter constellations: (a) before precoding, (b) after only amplitude precoding, (c) after only phase precoding, and (d) after both amplitude and phase precoding. Transmitter spectra: (e) before and (f) after up-conversion.

FIG. 10 shows example transmitter constellations: (a) before precoding, (b) after only amplitude precoding, (c) after only phase precoding, and (d) after both amplitude and phase precoding. FIG. 10 also shows example transmitter spectra: (e) before and (f) after up-conversion.

In one example setup to test the technique, the inventors designed an experiment in which, a 12-GHz precoded RF signal carrying 1- or 2-Gbaud 8QAM-modulated transmitter data is generated by MATLAB programming, and then uploaded into an arbitrary waveform generator (AWG) with 64-GSa/s sampling rate to drive the MZM biased at its maximum transmission point. According to the aforementioned theoretical analysis, in order to realize photonic frequency, the amplitude K2 and phase φ of the 12-GHz precoded RF signal should satisfy:

$$K_{8QAM}=J_4^2(\pi K_2 V_{drive}/V_\pi); \phi_{8QAM}=8\phi.$$  Eq. (17)

where $K_{8QAM}$ and $\phi_{8QAM}$ denote the amplitude and phase of an 8QAM symbol, respectively. The ratio of $V_{drive}$ to $V_\pi$ is set at 3 for the transmitter MATLAB programming. FIG. 10(a) shows an example transmitter 8QAM constellation, while FIGS. 10(b)-10(d) show the constellations after only amplitude precoding, after only phase precoding, and after both amplitude and phase precoding. FIGS. 10(e) and 10(f) show the transmitter spectra before and after up-conversion. We can see that there exists a large DC component in the transmitter spectra, which may contribute to the received SNR reduction. FIG. 10 is calculated at 2 Gbaud. For the 8QAM case, the order of amplitude precoding and phase precoding can be exchanged.

Example Setup and Results

Figure 11:
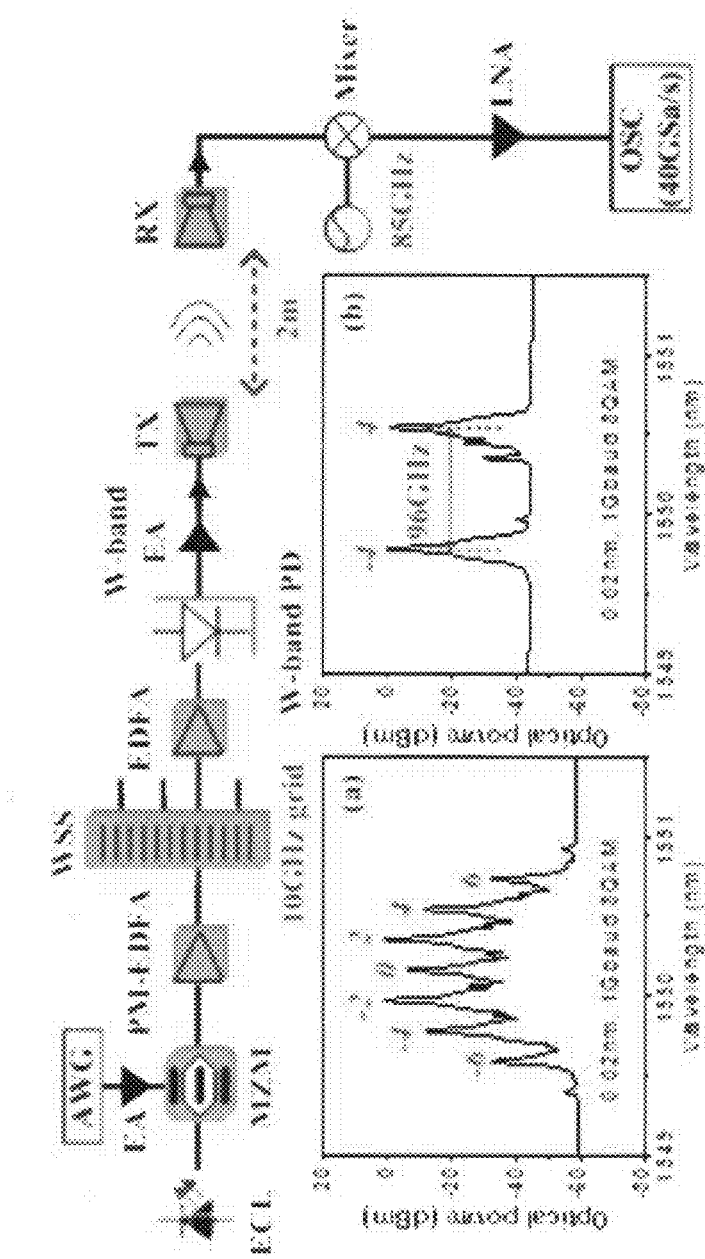
FIG. 11 shows an example experimental setup. Optical spectra (0.02-nm resolution): (a) after MZM and PM-EDFA; (b) after WSS and EDFA. ECL: external cavity laser, MZM: Mach-Zehnder modulator, AWG: arbitrary waveform generator, EA: electrical amplifier, PM-EDFA: polarization-maintaining erbium-doped fiber amplifier, WSS: wavelength selective switch, PD: photodiode, LNA: low-noise amplifier, OSC: oscilloscope.

FIG. 11 shows the experimental setup for 8QAM vector signal generation at W-band with photonic frequency octupling based on our proposed scheme. The CW output from an external cavity laser (ECL) is modulated by the aforementioned 12-GHz precoded RF signal via a MZM biased at its maximum transmission point. The 12-GHz precoded RF signal has a pattern length of 3×215 and is boosted by an electrical amplifier (EA) to ~26 dBm to drive the MZM. The MZM has a 3-dB bandwidth of ~36 GHz, 2.8-V half-wave voltage (Vπ) and 5-dB insertion loss. A polarization-maintaining erbium-doped fiber amplifier (PM-EDFA) is then used to compensate for modulation loss and insertion loss. FIG. 11(a) gives the measured optical spectrum (0.02-nm resolution) after the PM-EDFA, showing that only even-order optical subcarriers are generated with 24-GHz frequency spacing. Thus, the two fourth-order optical subcarriers are selected by a programmable 1×4 WSS with a 10-GHz grid to generate 96-GHz optical mm-wave signal. These two selected fourth-order optical subcarriers have the same amplitude but carry opposite phase information. The WSS operates in the C-band and introduces a 7-dB insertion loss. After boosted by an EDFA, the 96-GHz optical mm-wave signal is converted into 96-GHz electrical mm-wave 8QAM signal via a PD and amplified by a W-band EA with 30-dB gain and 3-dBm saturation output power. FIG. 11(b) gives the measured optical spectrum (0.02-nm resolution) after the WSS and the EDFA.

FIG. 11 shows an example experimental setup used by the inventors to experiment and prove the disclosed technique. The depicted optical spectra (0.02-nm resolution) includes: (a) after MZM and PM-EDFA; (b) after WSS and EDFA. ECL: external cavity laser, MZM: Mach-Zehnder modulator, AWG: arbitrary waveform generator, EA: electrical amplifier, PM-EDFA: polarization-maintaining erbium-doped fiber amplifier, WSS: wavelength selective switch, PD: photodiode, LNA: low-noise amplifier, OSC: oscilloscope.

The amplified 96-GHz electrical mm-wave carrier carrying the 8QAM-modulated transmitter data is radiated by a W-band horn antenna (HA), and received by another identical HA. The two HAs are separated by 2 m and each has a gain of 25 dBi. The received 96-GHz mm-wave 8QAM signal is first boosted by a W-band EA identical to the one at the transmitter end, and then down-converted by an 85-GHz sinusoidal RF source and a commercial balanced mixer into an 11-GHz electrical intermediate-frequency (IF) signal. The 11-GHz IF signal passes through a low-noise amplifier (LNA) and is then captured by a digital oscilloscope (OSC) with 40-GSa/s sampling rate and 16-GHz electrical bandwidth. The 8QAM-modulated transmitter data can be recovered from the 11-GHz IF signal after offline digital signal processing (DSP), which includes IF down conversion, cascaded multi-modulus algorithm (CMMA) equalization, frequency offset estimation (FOE), and carrier phase estimation (CPE). Note that in our experiment, the practical ratio of Vdrive to Vπ of the MZM may deviate from that set in the transmitter MATLAB programming in some degree and thus affect the detected amplitude information after the PD, which, however, can be compensated by receiver CMMA equalization.

Figure 12:
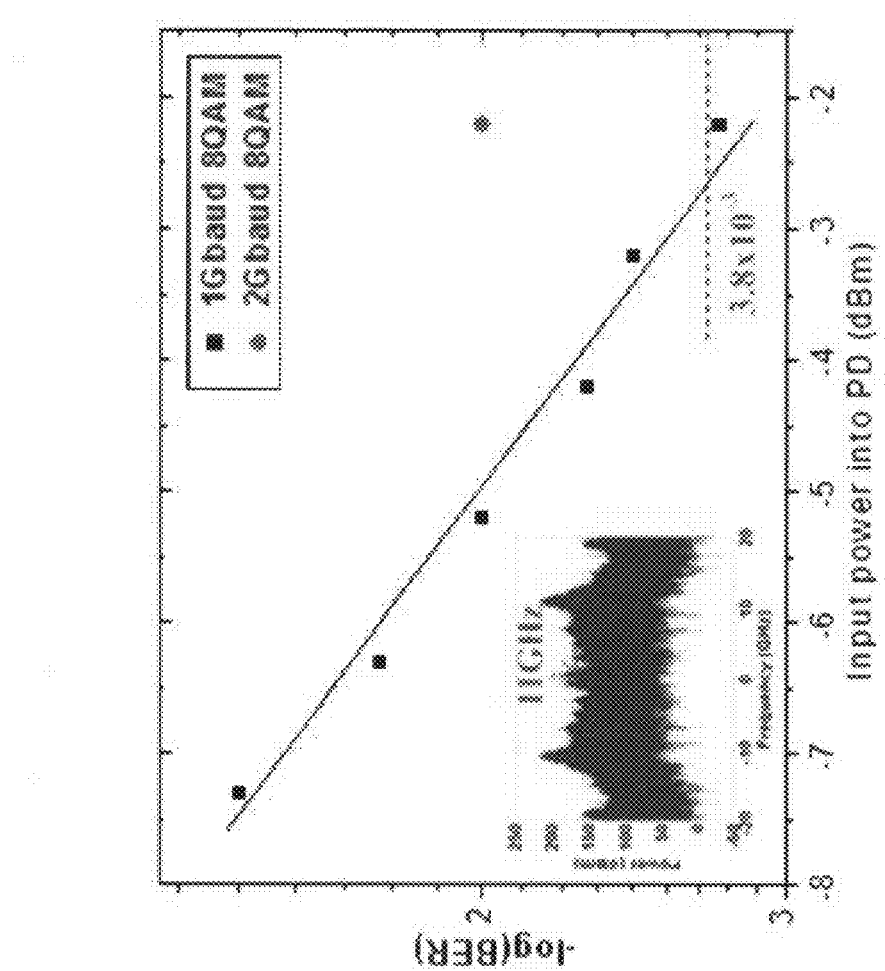
FIG. 12 shows an example of measured BER versus the launched optical power into PD.

FIG. 12 depicts an example of measured bit error rate (BER) versus the launched optical power into PD. FIG. 12 shows the measured bit-error-ratio (BER) versus the launched optical power into PD for 1- and 2-Gbaud mm-wave 8QAM signal at 96 GHz after 2-m wireless delivery. The BER can reach the hard-decision forward-error-correction (HD-FEC) threshold of $3.8 \times 10^{-3}$ at 1 Gbaud. For 2 Gbaud, the BER can only get $1 \times 10^{-2}$. The observed BER degradation at 2 Gbaud is mainly due to the reduced main-lobe power of the precoded RF signal generated by MATLAB programming. The inset in FIG. 12 shows that the SNR of the signal is not high. Inset (a) in FIG. 12 shows the 11-GHz IF spectrum at 1 Gbaud when the launched power into PD is −2.2 dBm and the BER is $1.8 \times 10^{-3}$.

Figure 13:
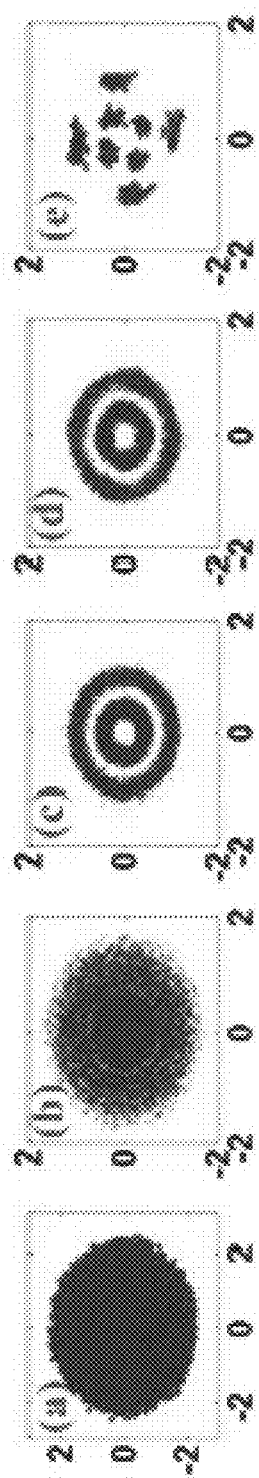
FIG. 13 shows examples of received 8QAM constellations: (a) before clock extraction, (b) after clock extraction, (c) after CMA equalization, (d) after FOE and (e) after CPE.

FIG. 13 depicts an example of received 8QAM constellations: (a) before clock extraction, (b) after clock extraction, (c) after CMA equalization, (d) after FOE and (e) after CPE. FIGS. 13(a)-13(e) show the received constellations before clock extraction, after clock extraction, after CMMA equalization, after FOE and after CPE for the 1-Gbaud mm-wave 8QAM signal at 96 GHz after 2-m wireless delivery, respectively. The corresponding BER is $1.8 \times 10^{-3}$.

It will be appreciated that techniques for photonic multi-amplitude QAM vector signal generation at microwave/mm-wave bands enabled by MZM-based adaptive photonic frequency multiplication of the precoded microwave vector signal used to drive a single MZM have been disclosed. The inventors have experimentally tested photonic 8QAM vector signal generation at W-band by using the same photonic frequency multiplication scheme up to octupling. The MZM is driven by a 12-GHz precoded RF signal carrying 1- or 2-Gbaud 8QAM transmitter data. The phase of the precoded RF signal is ⅛ of that of the regular 8QAM symbol, while its amplitude depends on the amplitude of the regular 8QAM symbol, the order of the optical subcarriers selected for heterodyne mixing as well as the ratio of driving voltage to half-wave voltage of the MZM. The generated 1-Gbaud 96-GHz 8QAM vector signal can be transmitted wirelessly over 2 m with a BER under $3.8 \times 10^{-3}$.

8QAM, 16QAM and 64QAM Vector Signal Generation with Frequency Multiplexing Based on Single MZM using Simulation In some embodiments, simulation has been conducted to generate 8QAM signals as well as higher order QAM such as 16QAM and 64QAM.

The principle for amplitude precoding for 16QAM and 64QAM is the same as 8QAM. The PD output when MZM is biased at the maximum point is:

$$i_{RF}(t)=\tfrac{1}{2}RJ_{2n}^2(\kappa)\cos[2\pi \cdot 4nf_s t+4n\phi(t)], (n=1,2\ldots)$$  Eq. (18)

The PD output when MZM is biased at the minimum point is:

$$i_{RF}(t)=\tfrac{1}{2}RJ_{2n-1}^2(\kappa)\cos[2\pi \cdot 2(2n-1)f_s t+2(2n-1)\phi(t)],$$
$$(n=1,2\ldots)$$  Eq. (19)

In Eq. (18) and Eq. (19), κ=Kπ. K denotes the modulus of QAM symbol. Assume that the square of Bessel function is equal to the modulus of QAM symbol, by solving the square of Bessel function, a new value for K can be computed, which is the precoded amplitude for driving RF vector signal. For simulation purposes, κ=VdriveKπ/Vpi, where K denotes the same modulus of QAM symbol.

In some exemplary simulations, 512 8QAM/16QAM/64QAM symbols are adopted for calculation, and each 8QAM/16QAM/64QAM symbol corresponds to 512 sampling points. Here, the sampling rate is set for the overall VPI simulation system and a very high RF frequency is adopted for the down conversion at the receiver, and thus a high sampling rate is used. The bit rate for 8QAM is 3 Gb/s. Here, the bit rate can be further improved. In some embodiments, 9 Gb/s for 8QAM can also be used. Other simulation values used for MZM include: VpiDC=VpiRF=5V, drive amplitude=5V, the maximum bias point=0, and the minimum bias point=2.5V.

Figure 19:
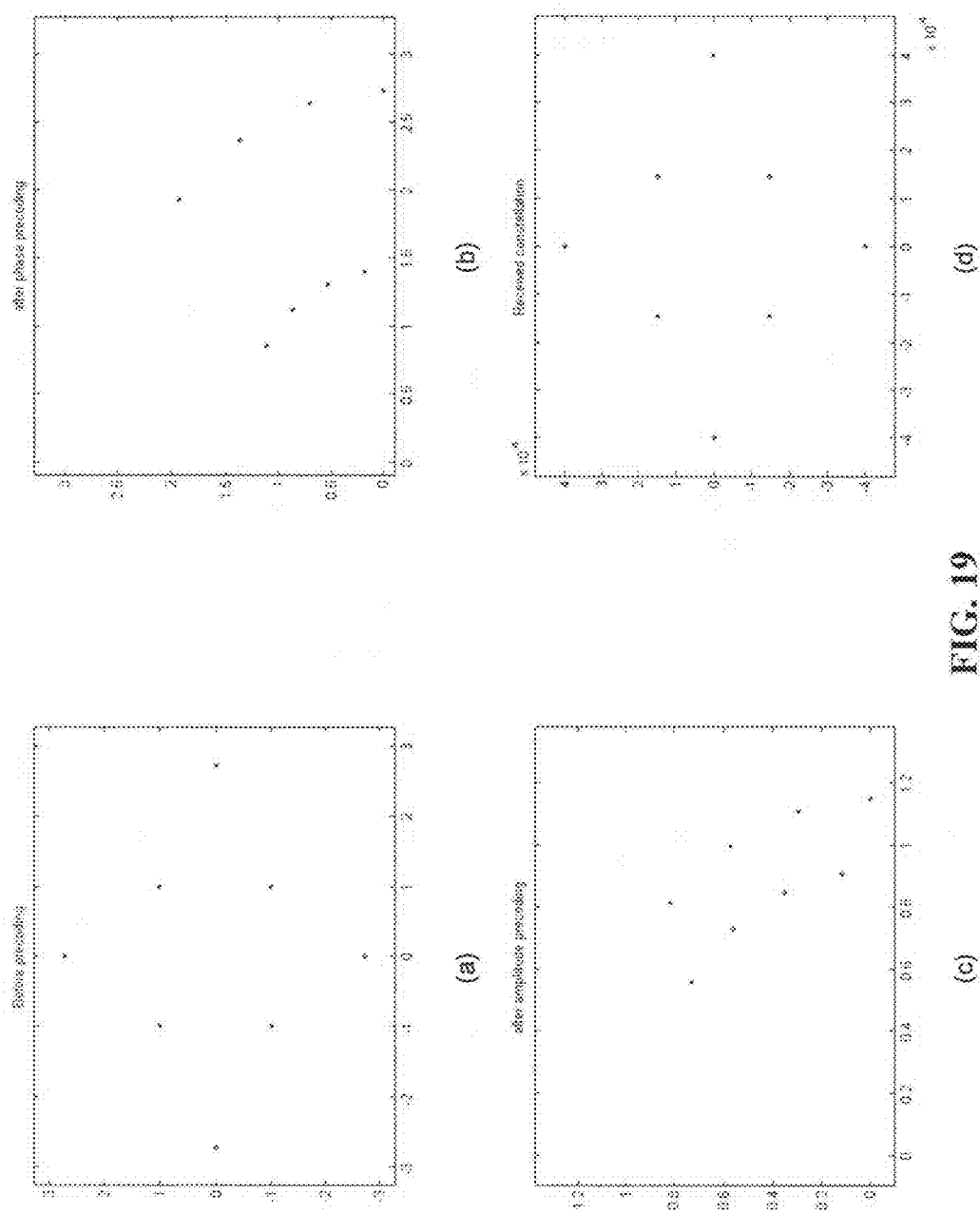
FIG. 19 shows an example transmitter constellation for 8QAM with phase precoding conducted first.

FIG. 19 shows an example transmitter constellation for 8QAM with phase precoding conducted first: (a) before precoding, (b) after phase precoding, (c) after both phase and amplitude precoding, and (d) received constellation.

Figure 20:
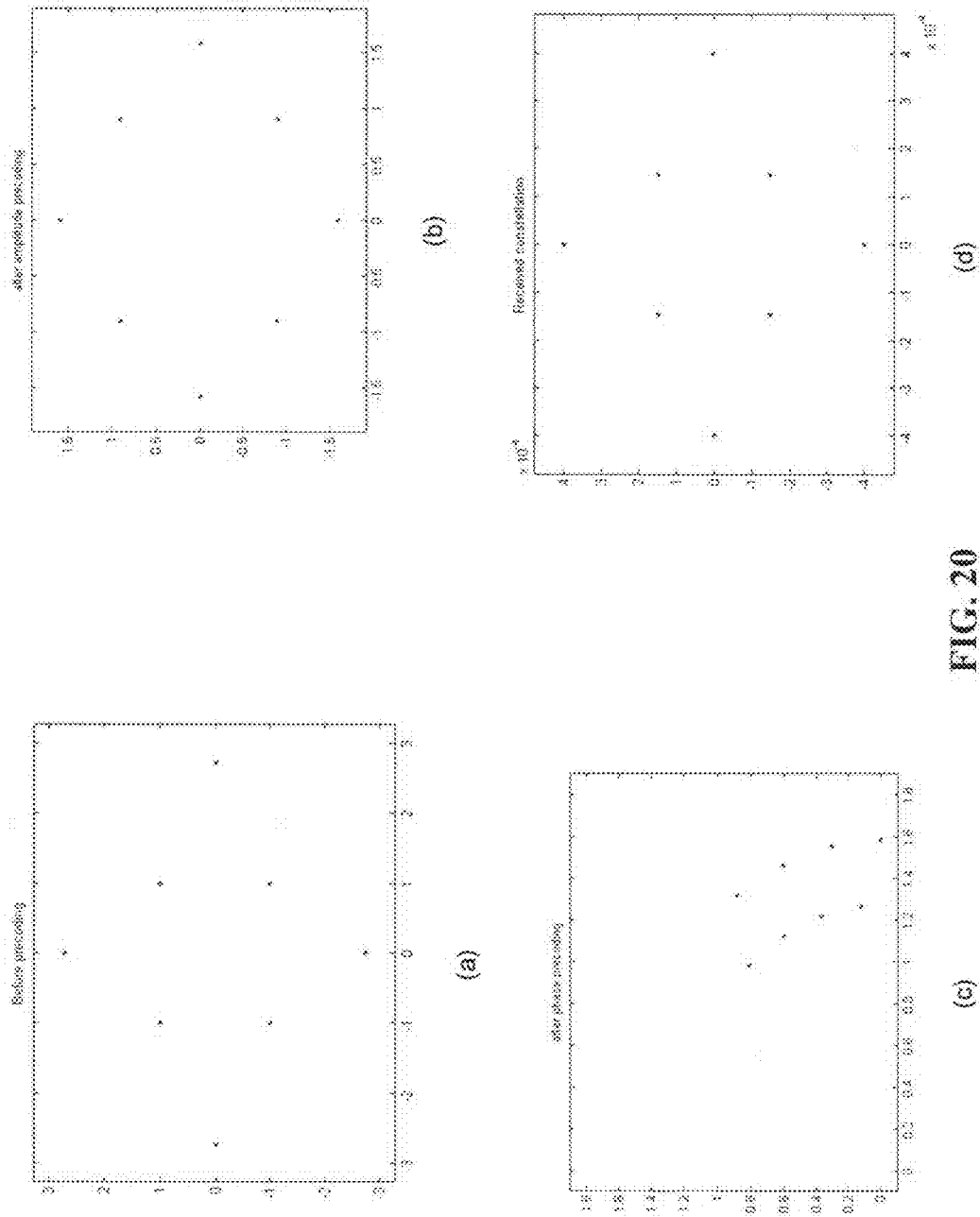
FIG. 20 shows an example transmitter constellation for 8QAM with amplitude precoding conducted first.

FIG. 20 shows another example transmitter constellation for 8QAM with amplitude precoding conducted first: (a) before precoding, (b) after amplitude precoding, (c) after both amplitude and phase precoding, and (d) received constellation.

Figure 21:
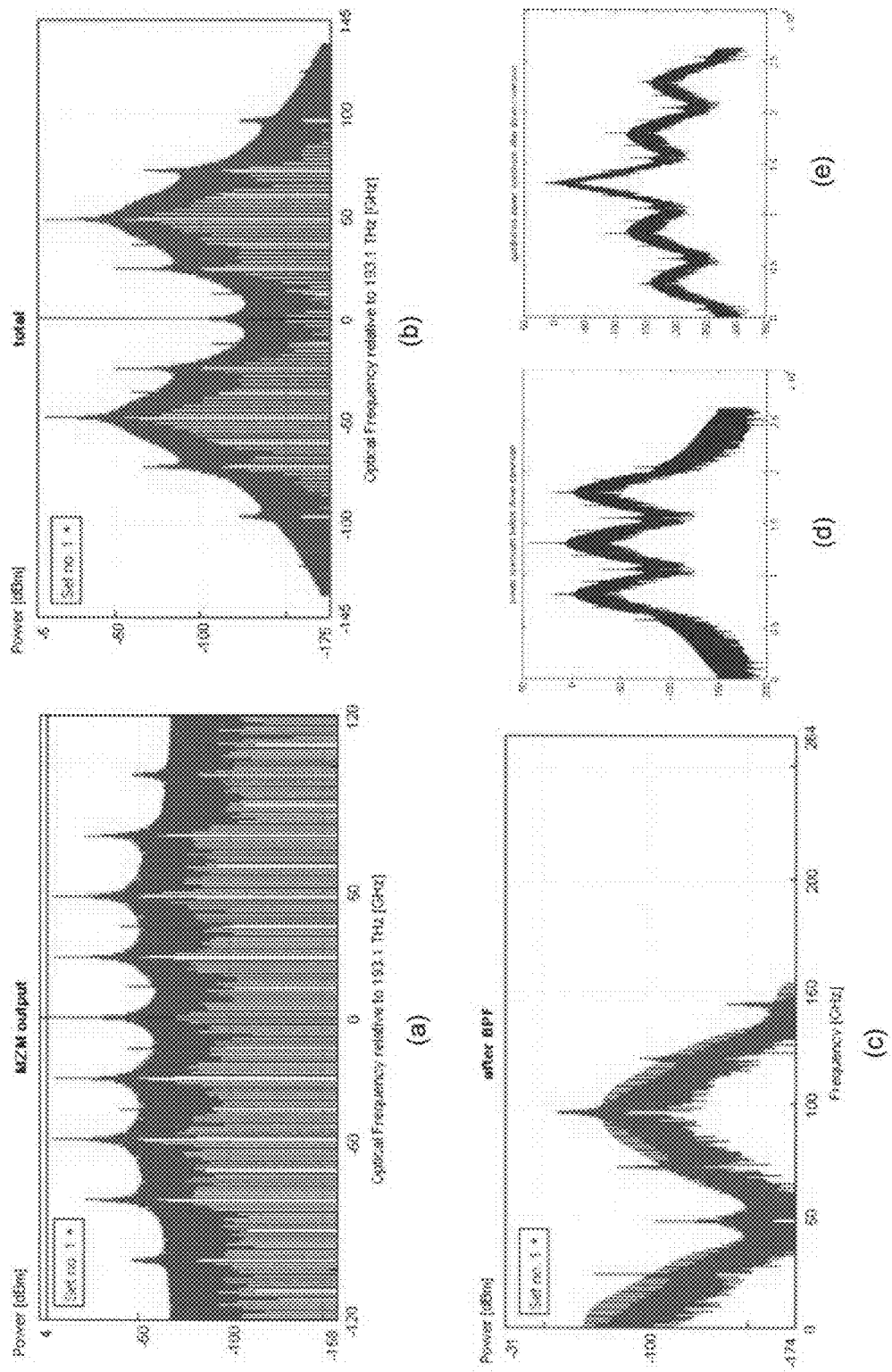
FIG. 21 shows an example of signal spectrum for 8QAM simulation.

FIG. 21 depicts an example of signal spectrum for 8QAM simulation. (a) MZM output (even-order, 24-GHz spacing), (b) WSS output (two 4-order subcarriers, 96 GHz), (c) PD output (calculated by VPI), (d) PD output (calculated by MATLAB), and (e) after down conversion and LPF (calculated by MATLAB).

Figure 22:
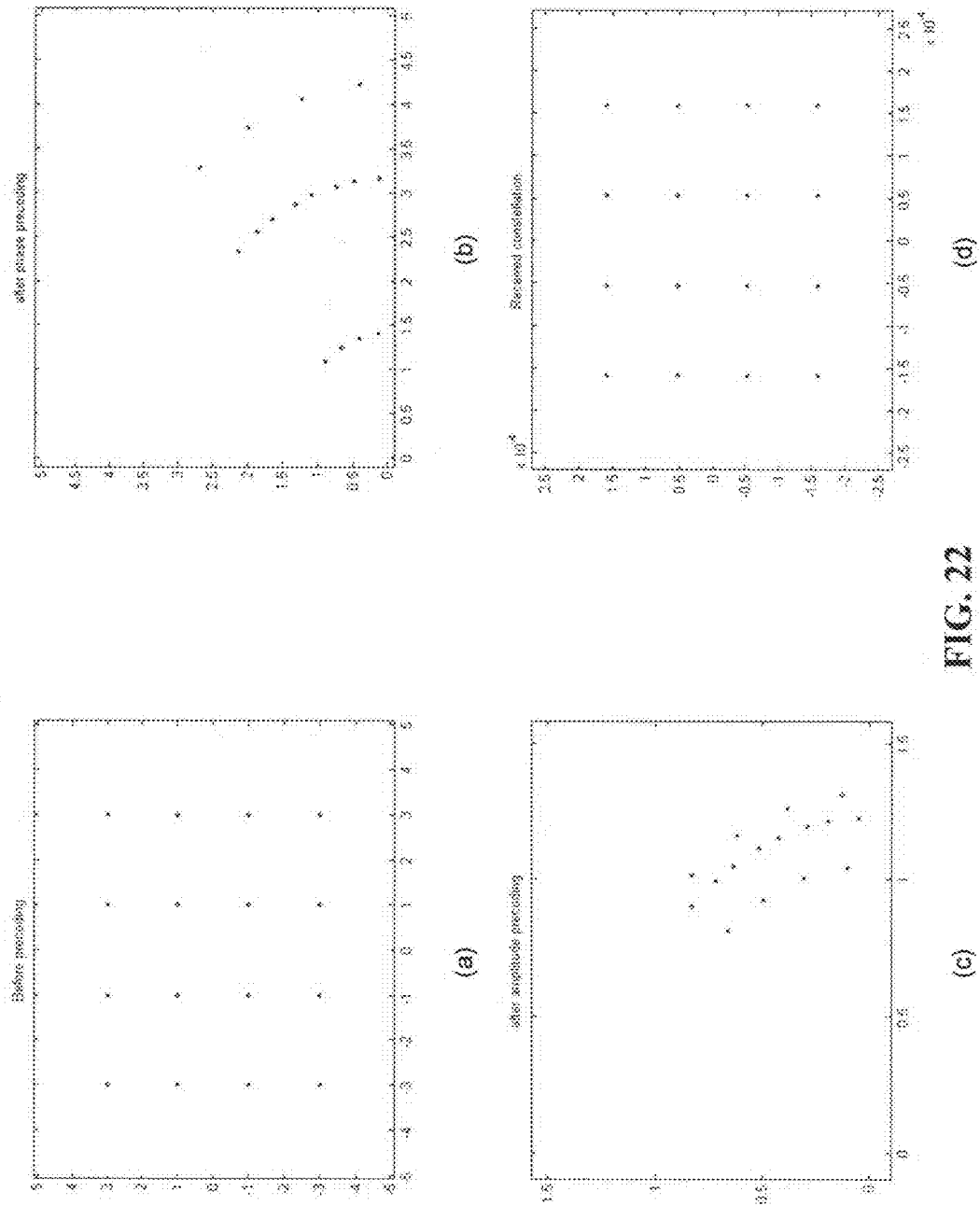
FIG. 22 shows an example transmitter constellation for 16QAM with phase precoding conducted first.

FIG. 22 shows an example transmitter constellation for 16QAM with phase precoding conducted first: (a) before precoding, (b) after phase precoding, (c) after both phase and amplitude precoding, and (d) received constellation.

Figure 23:
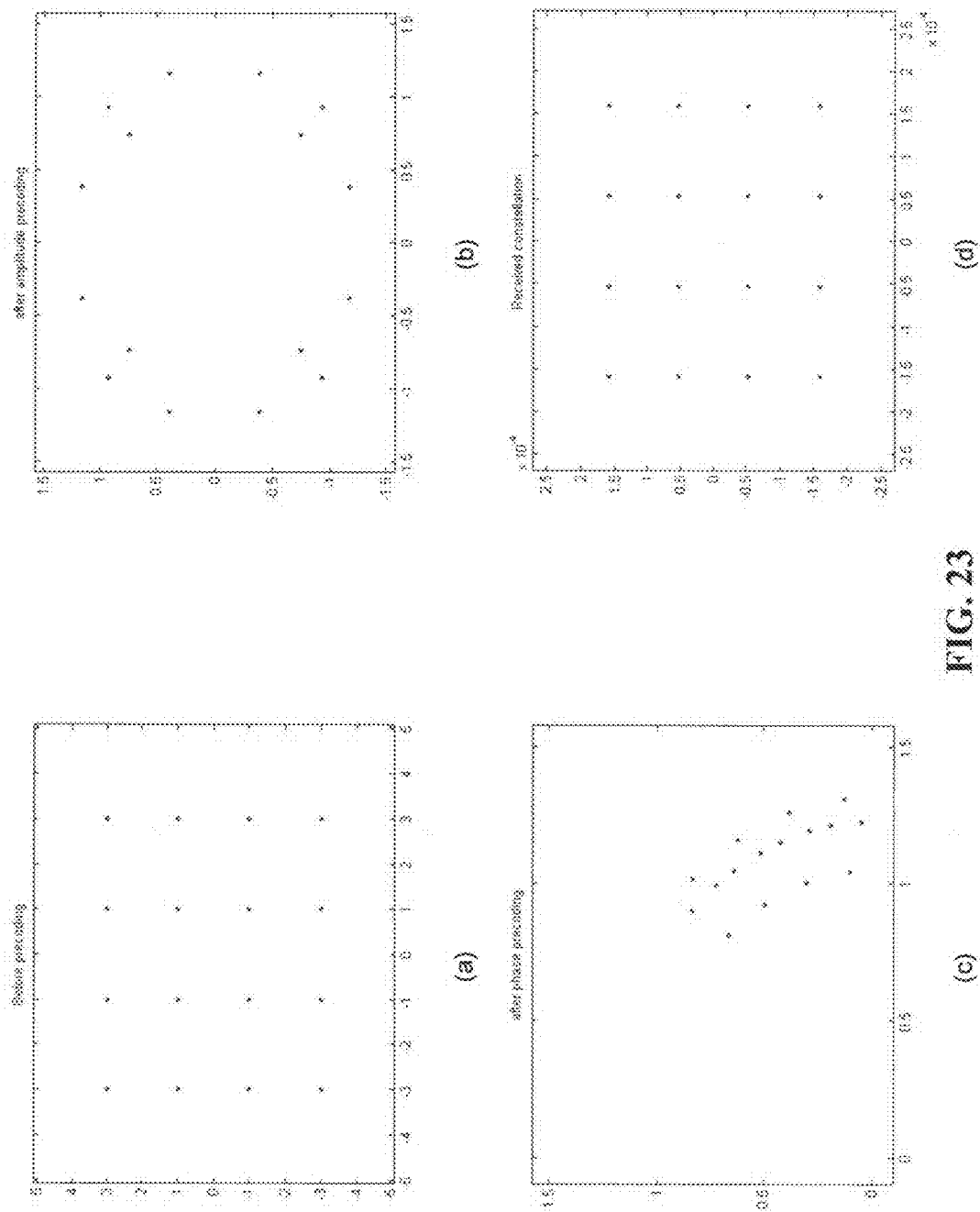
FIG. 23 shows an example transmitter constellation for 16QAM with amplitude precoding conducted first.

FIG. 23 shows another example transmitter constellation for 16QAM with amplitude precoding conducted first: (a) before precoding, (b) after amplitude precoding, (c) after both amplitude and phase precoding, and (d) received constellation.

Figure 24:
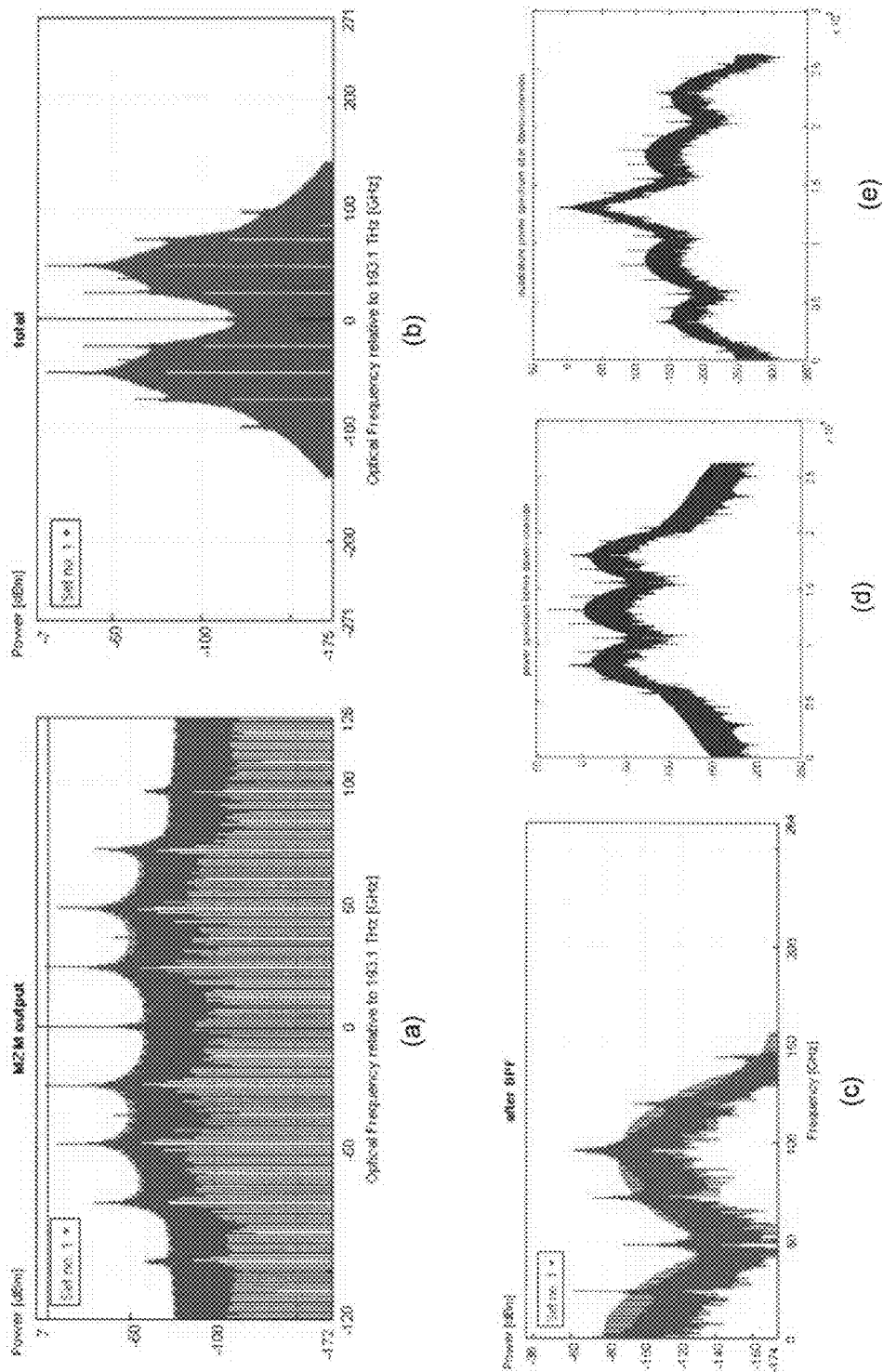
FIG. 24 shows an example of signal spectrum for 16QAM simulation.

FIG. 24 depicts an example of signal spectrum for 16QAM simulation. (a) MZM output (even-order, 24-GHz spacing), (b) WSS output (two 4-order subcarriers, 96 GHz), (c) PD output (calculated by VPI), (d) PD output (calculated by MATLAB), and (e) after down conversion and LPF (calculated by MATLAB).

Figure 25:
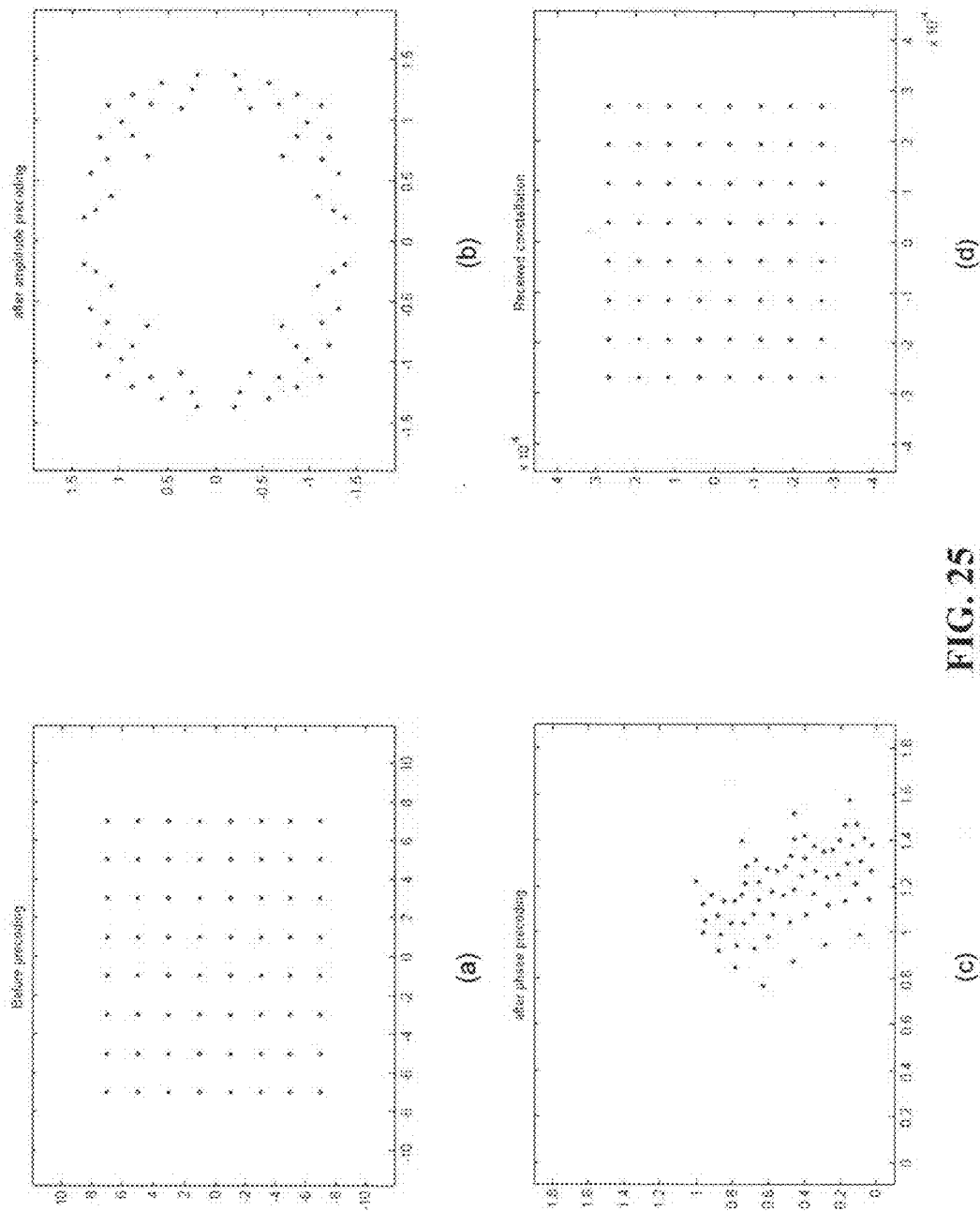
FIG. 25 shows an example transmitter constellations for 64QAM with amplitude precoding conducted first.

FIG. 25 shows an example transmitter constellation for 64QAM with amplitude precoding conducted first: (a) before precoding, (b) after amplitude precoding, (c) after both amplitude and phase precoding, and (d) received constellation.

Figure 26:
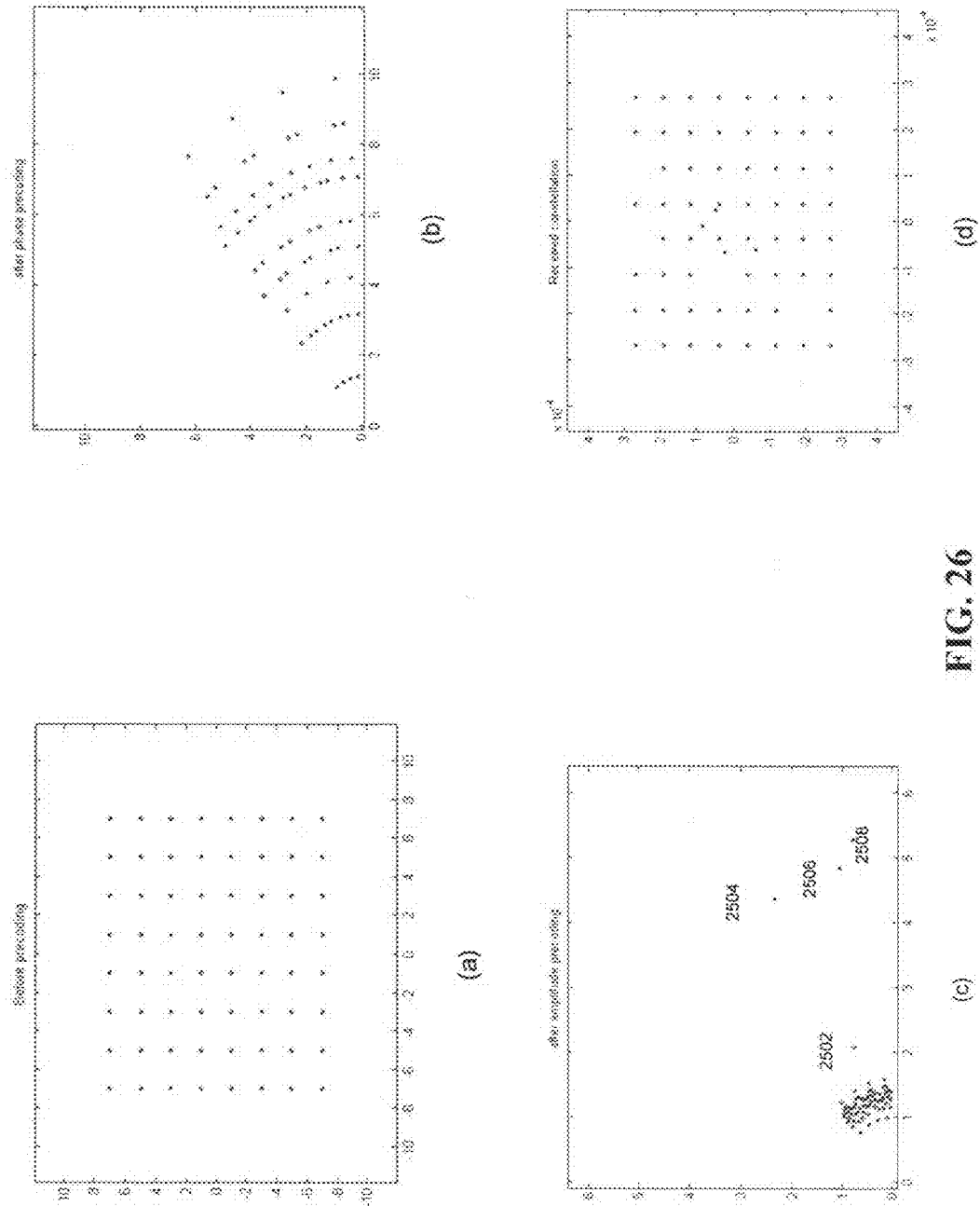
FIG. 26 shows an example transmitter constellation for 64QAM with phase precoding conducted first.

FIG. 26 shows another example transmitter constellation for 64QAM with phase precoding conducted first: (a) before precoding, (b) after phase precoding, (c) after both phase and amplitude precoding, and (d) received constellation. When phase precoding is conducted first for 64QAM, some constellation points cannot be recovered. For example, in FIG. 25(c), point 2502, 2504, 2506 and 2508 cannot be successfully amplitude-precoded, and they are located at the second, the sixth and the seventh rings.

Figure 27:
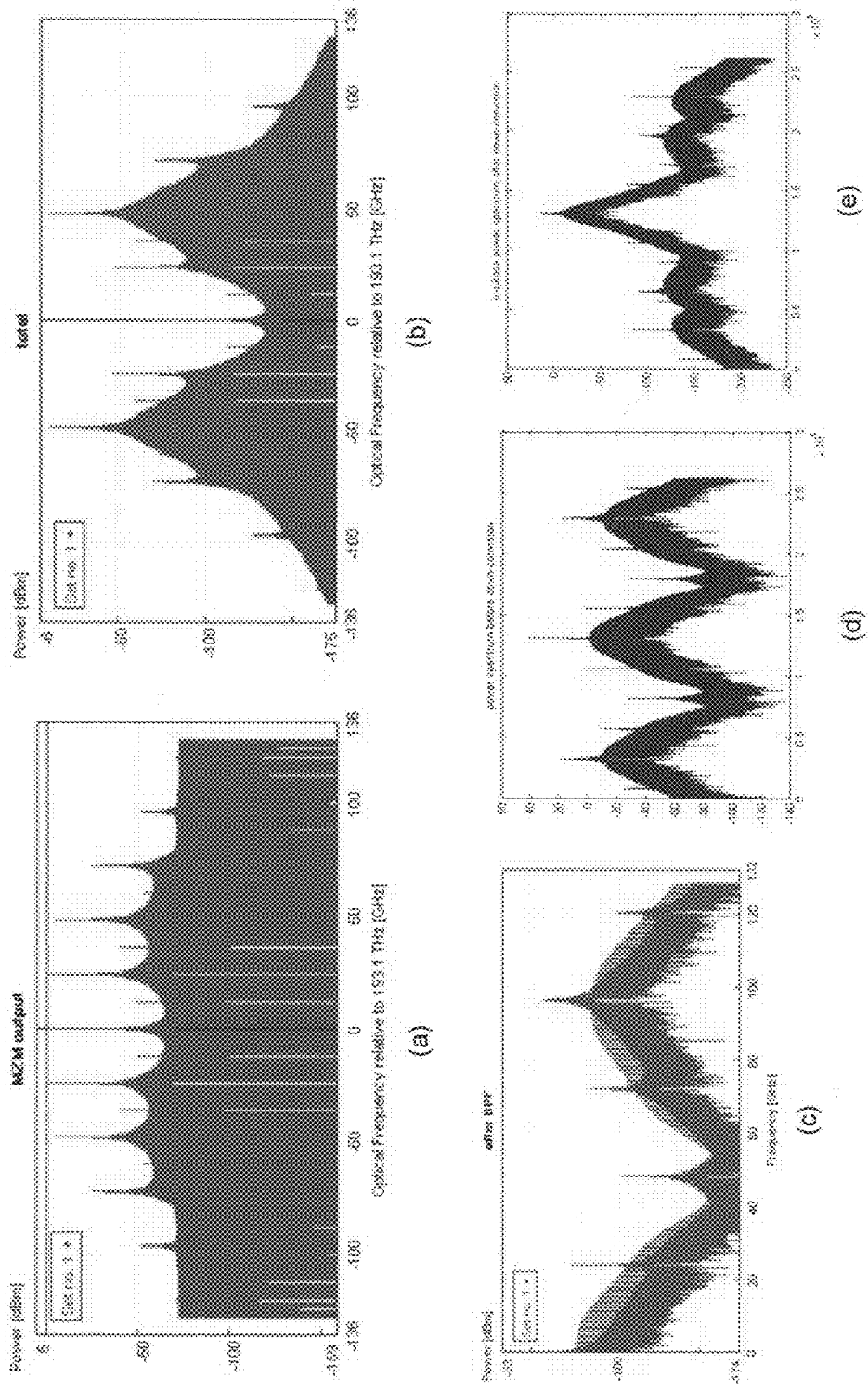
FIG. 27 shows an example of signal spectrum for 64QAM simulation.

FIG. 27 depicts an example of signal spectrum for 64QAM simulation. (a) MZM output (even-order, 24-GHz spacing), (b) WSS output (two 4-order subcarriers, 96 GHz), (c) PD output (calculated by VPI), (d) PD output (calculated by MATLAB), and (e) after down conversion and LPF (calculated by MATLAB).

In some embodiments, a variable named "ratio" is introduced into MATLAB-based amplitude precoding programming: ratio=$V_{drive}/V_{pi}$. The variable is equal to the ratio of driving voltage to half-wave voltage of the MZM. The value of the variable "ratio" in MATLAB programming needs adjusting when the driving voltage of the MZM changes. The value of the variable "ratio" in MATLAB programming should be set according to the driving voltage of the MZM in VPI software.

The value of the variable "ratio" can be fixed in MATLAB programming. In some embodiments, "ratio" is equal to 1.5. Simulation can be conducted by changing the value of Vdrive of the MZM in VPI software and studying how the constellations can be affected when Vdrive deviates from its ideal value. In some embodiments, the ideal values are Vdrive=7.5V, Vpi=5V.

When the practical driving voltage is smaller than the corresponding ideal value, the constellation points appear "convergence". When the practical driving voltage is larger than its ideal value, the constellation points appear "divergence". However, when the practical driving voltage varies in a certain range, the BER remains to be zero and the transmitted data can still be successfully recovered.

Figure 28:
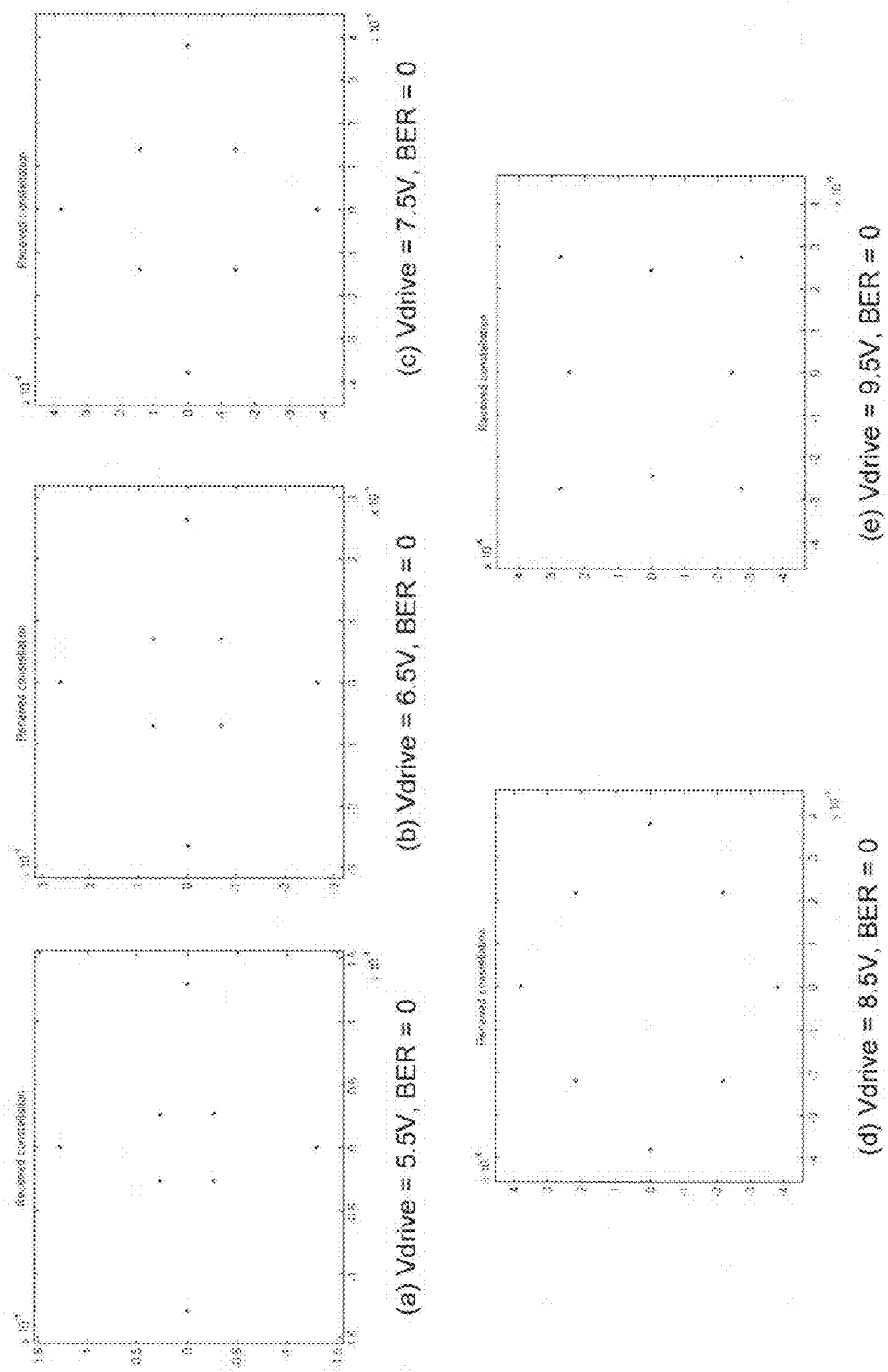
FIG. 28 shows an example of received constellations for 8QAM.

FIG. 28 shows an example of received constellations for 8QAM using different Vdrive values: (a) Vdrive=5.5V and BER=0, (b) Vdrive=6.5V and BER=0, (c) Vdrive=7.5V and BER=0, (d) Vdrive=8.5V and BER=0, and (e) Vdrive=9.5V and BER=0. Vdrive=7.5V is the ideal case.

Figure 29:
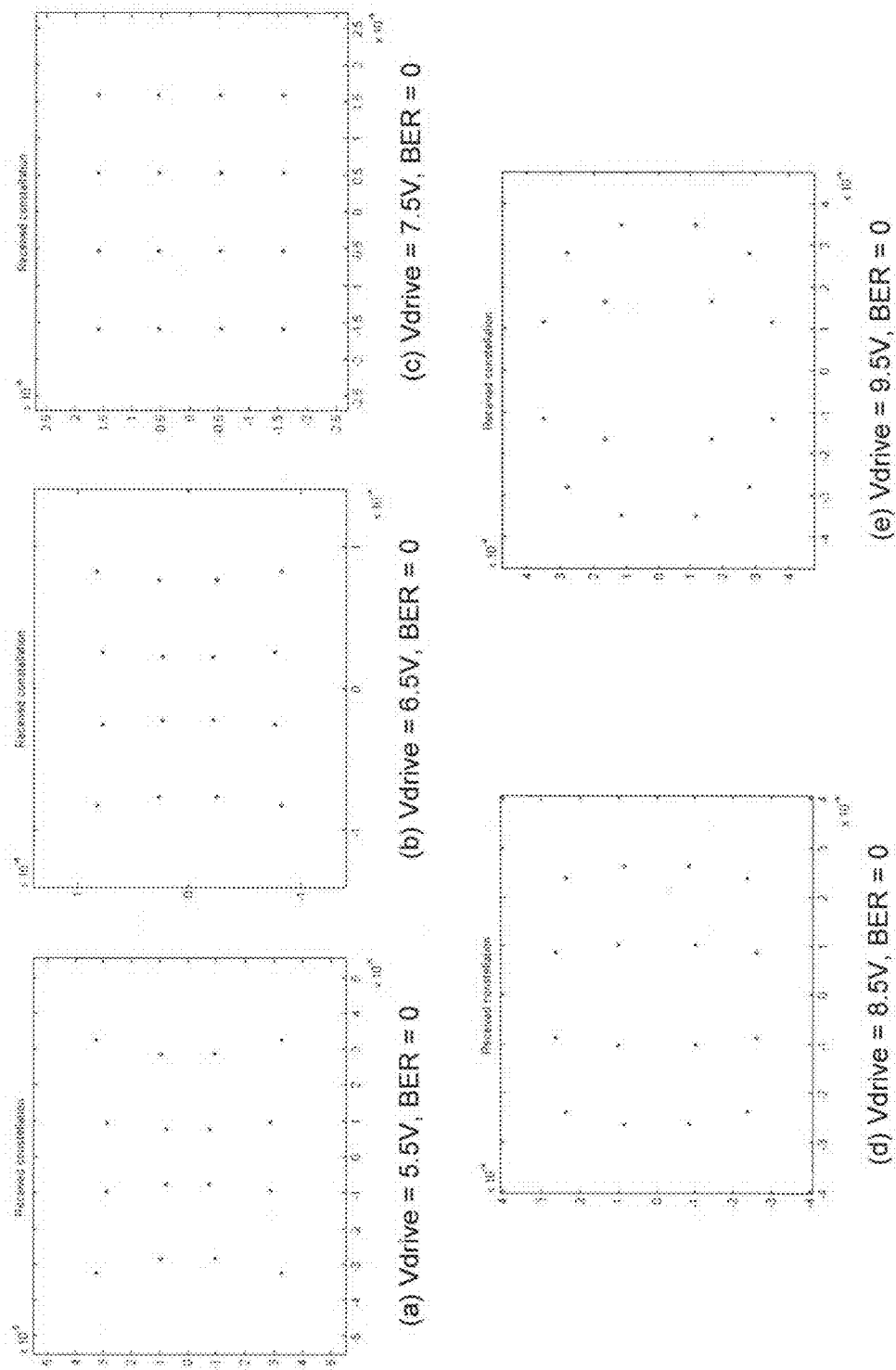
FIG. 29 shows an example of received constellations for 16QAM.

FIG. 29 shows an example of received constellations for 16QAM using different Vdrive values: (a) Vdrive=5.5V and BER=0, (b) Vdrive=6.5V and BER=0, (c) Vdrive=7.5V and BER=0, (d) Vdrive=8.5V and BER=0, and (e) Vdrive=9.5V and BER=0. Vdrive=7.5V is the ideal case.

Figure 30:
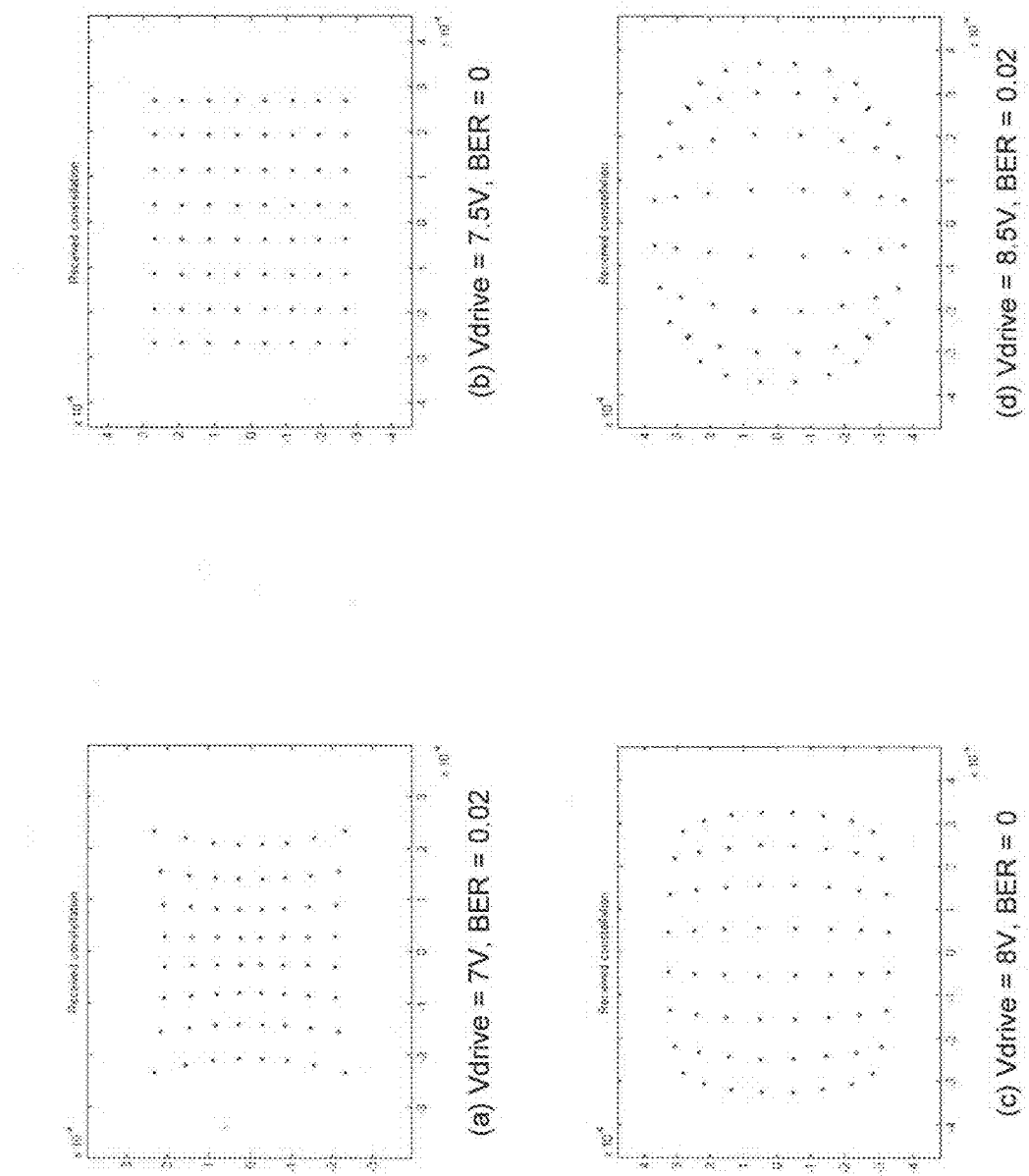
FIG. 30 shows an example of received constellations for 64QAM.

FIG. 30 shows an example of received constellations for 64QAM using different Vdrive values: (a) Vdrive=7V and BER=0.02, (b) Vdrive=7.5V and BER=0, (c) Vdrive=8V and BER=0, and (d) Vdrive=8.5V and BER=0.02. Vdrive=7.5v is the ideal case. Compared to 8QAM/16QAM, 64 QAM has a smaller tolerance to the deviation of the practical driving voltage.

Figure 14:
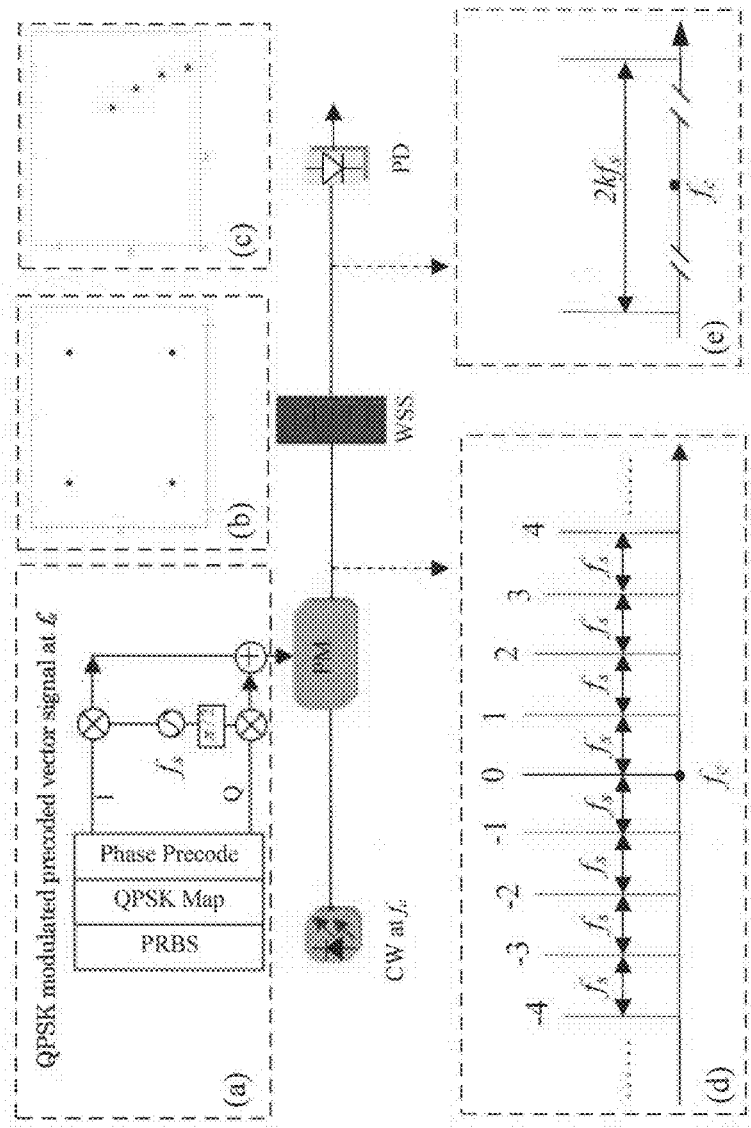
FIG. 14 shows an example of the principle of photonic vector signal generation at mm-wave bands based on frequency multiplication technique.

QPSK Vector Signal Generation with Frequency Multiplexing Based on Single Optical Phase Modulator Principle of Photonic Vector Signal Generation at Microwave/mm-Wave Bands FIG. 14 illustrates an example setup of photonic vector signal generation at mm-wave bands based on frequency multiplication technique and phase modulator. In the system, a pseudo-random binary sequence (PRBS) sequence is QPSK mapped (user data can be used in deployed systems). The generated QPSK signal is precoded based on phase information, and then the I and Q branches of the QPSK phase-precoding signal are up-converted into an intermediate-frequency (IF) signals at fs by mixing with two sinusoidal RF signals with quadrature phase at fs, respectively. The summation of the two IF signals is the desired electrical vector signal. The photonic vector signal is generated by a phase modulator driven by the electrical vector signal. Assume that the continuous-wavelength (CW) lightwave at fc in the system can be expressed as:

$$E_{laser}=A_{laser}\exp(j2\pi f_c t) \qquad \text{Eq. (18)}$$

where $A_{laser}$ and $f_c$ are the amplitude and frequency of the CW lightwave at $f_c$, respectively. The electrical vector signal at $f_x$ can be expressed as:

$$E_{driver}=A_{driver}\cos[2\pi f_s t+\phi(t)] \qquad \text{Eq. (19)}$$

where $A_{driver}$, $f_s$ and $\phi$ are the amplitude, frequency and phase of the electrical vector signal $f_s$, respectively. The generated optical vector signal from the phase modulator (PM) can be expressed as:

$$E_{PM} = A_{laser} \exp\left( j2\pi f_c t + j\pi \frac{A_{driver} \cos[2\pi f_s t + \phi(t)]}{V_\pi} \right) = \quad \text{Eq. (20)}$$

$$A_{laser} \sum_{k=-\infty}^{k=\infty} j^k J_k(\xi_p) \exp[j2\pi(f_c + kf_s)t + jk\phi(t)].$$

where $J_k$ is the first kind Bessel function of order k, $\xi_p = \pi V_{driver}/V_\pi$ is the modulation index of the PM, and $V_\pi$ is half-wave voltage of the PM. Thus, in Eq. (20), the optical signal of the output of PM can be represented as the optical central carrier and the optical sidebands. The amplitude of optical central carrier and the optical sidebands is proportional to their Bessel function of order k ($J_k$). According to the nature of the Bessel function, the $J_k$ declines with increasing k when $\xi_p$ is fixed. The signal discrete spectrum after the PM is showed in FIG. 14(d). Eq. (20) also shows that the phases of two optical subcarriers separated in frequency by $2 kf_s$ are orthogonal. Because the photo detector (PD) conversion follows the square-law rule, the output current of the PD for the optical sidebands with orthogonal phase is direct current signal and can be expressed as:

$$i_{RF}(t) = RE_{PM}^* E_{PM}^* = R|E_{PM}|^2 = \quad \text{Eq. (21)}$$

$$R \left| A_{laser} \sum_{k=-\infty}^{k=\infty} j^k J_k(\xi_p) \exp[j2\pi(f_c + kf_s)t + jk\varphi(t)] \right|^2 =$$

$$R \cdot A_{laser}^2 \left| \sum_{k=-\infty}^{k=\infty} J_k(\xi_p) \right|^2 = R \cdot A_{laser}^2$$

where R is the conversion efficiency of the PD. So when two optical subcarriers are selected as carrier of system, the selected two optical subcarriers must be in the same order, or the two optical subcarriers are separated in frequency by $2 kf_s$. In the transmission system, two optical subcarriers with $2kf_s$ frequency spacing are selected by a wavelength selective switch (WSS) as carrier of transmission system. The signal spectrum after WSS is showed in FIG. 14(e) and the signal after WSS can be expressed as:

$$E_{WSS} = A_{laser} j^k J_k(\xi_p) \exp j[2\pi(f_c + kf_s)t + jk\phi(t)] + \quad \text{Eq. (22)}$$

$$A_{laser} j^{-k} J_{-k}(\xi_p) \exp j[2\pi(f_c - kf_s)t - jk\phi(t)]$$

$$= A_{laser} j^k J_k(\xi_p) \exp j[2\pi(f_c + kf_s)t + jk\phi(t)] +$$

$$(-1)^k \cdot j^{-2k} \cdot A_{laser} j^k J_k(\xi_p) \exp j[2\pi(f_c - kf_s)t - jk\phi(t)]$$

$$= A_{laser} j^k J_k(\xi_p) \{\exp[j2\pi(f_c + kf_s)t + jk\phi(t)] +$$

$$\exp[j2\pi(f_c - kf_s)t - jk\phi(t)]\}.$$

Then the photonic vector signal after WSS is converted into electrical mm-wave signal by a PD, and the output current of the PD can be expressed as:

$$i_{RF}(t) = R \cdot \left| A_{laser} j^k J_k(\xi_p) \{\exp[j2\pi(f_c + kf_s)t + jk\phi(t)] + \atop \exp[j2\pi(f_c - kf_s)t - jk\phi(t)]\} \right|^2 \quad \text{Eq. (23)}$$

$$= R \cdot A_{laser}^2 \left[ \begin{array}{c} j^k J_k(\xi_p) \{\exp[j2\pi(f_c + kf_s)t + jk\phi(t)] + \\ \exp[j2\pi(f_c - kf_s)t - jk\phi(t)]\} \end{array} \right] \times$$

$$\left[ \begin{array}{c} j^k J_k(\xi_p) \{\exp[j2\pi(f_c + kf_s)t + jk\phi(t)] + \\ \exp[j2\pi(f_c - kf_s)t - jk\phi(t)]\} \end{array} \right]^*$$

$$= (-1)^k R \cdot A_{laser}^2 J_k^2(\xi_p) \{\exp[j2\pi \cdot 2kf_s t + j2k\phi(t)] +$$

$$\exp[j2\pi \cdot (-2k)f_s t - j2k\phi(t)]\}.$$

where R is the conversion efficiency of the photon detector (PD). We can see from Eq. (23) that the frequency and phase of signal after PD is 2 k times that of the electrical vector signal for the drive of the PM. So the phase of phase-precoding signal should be ½ k of that of regular QPSK signal, to ensure that the signal after PD can be restored to regular QPSK mm-wave signal. In our experimental system, we use frequency-octupled modulation, and select two fourth-order modes as carrier. The wavelength spacing between the two fourth-order modes is 8 fs, and therefore the phase of phase-precoding signal is ⅛ of that of regular QPSK signal.

The constellations of the regular QPSK signal and QPSK phase-precoding signal are showed in FIGS. 14(b) and 14(c), respectively. Similarly, when other two odd-order or even-order optical sidebands with $2 kf_s$ frequency spacing are selected as carrier, the phase of phase-precoding signal is ½ k of that of regular QPSK signal.

Experimental Verification

Figure 15:
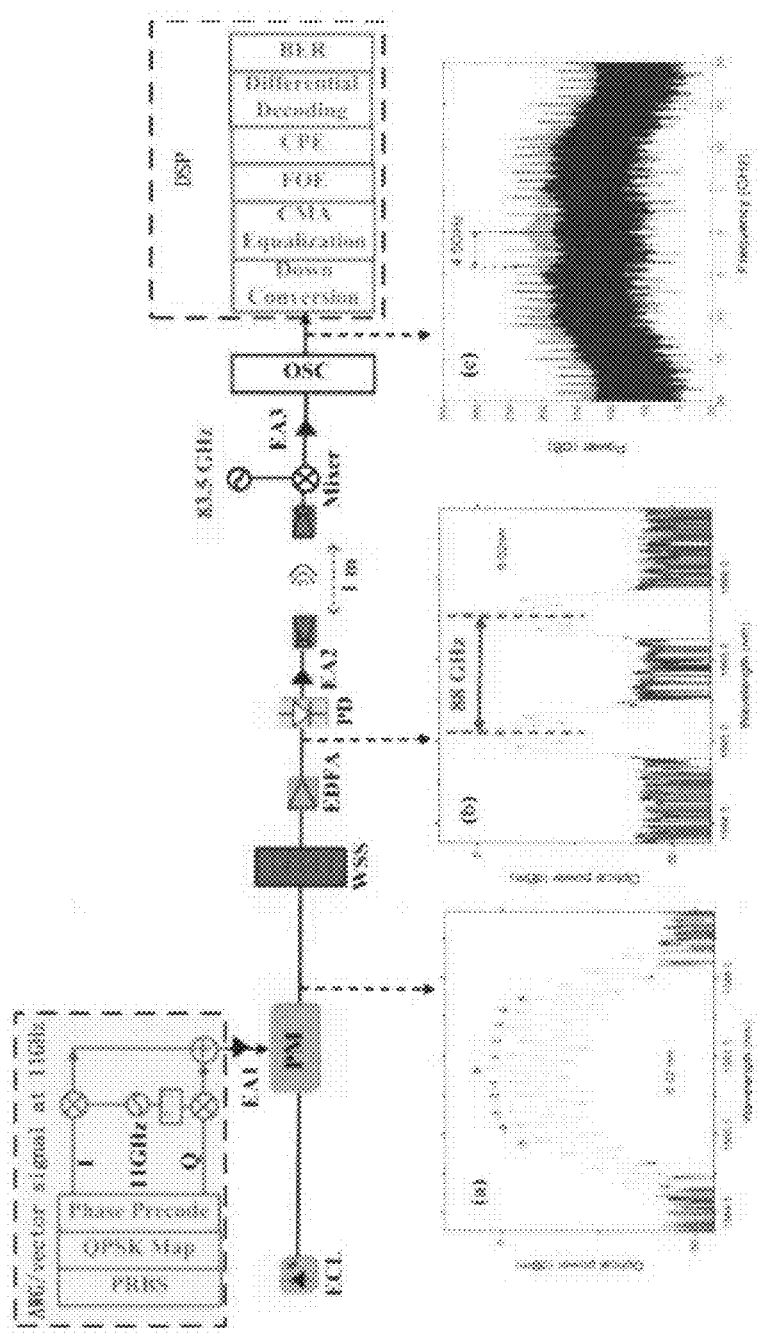
FIG. 15 shows an example experimental setup for the photonic QPSK-modulated vector signal transmission at W-band adopting photonic frequency octupling (×8).

FIG. 15 shows an example transmission system setup for photonic QPSK-modulated vector signal transmission at W-band adopting photonic frequency octupling (×8).

In the transmission system, the tunable external cavity laser (ECL) used as an optical source has a linewidth of about 100 kHz and an central operating wavelength of 1565.41 nm with the average output power of 13.54 dBm. The electrical QPSK-modulated precoded vector signal at 11 GHz is generated offline with MATLAB programming, and then uploaded into a commercial arbitrary waveform generator (AWG).

The process for the generation of the QPSK-modulated vector signal is showed in FIG. 15(a). The adopted PRBS length is $2^{12}$. The sample rate of the AWG is 24 GSa/s, and the rate of the phase-precoding QPSK signal is 500 Mbaud or 1 Gbaud. Then the generated QPSK-modulated vector signal is amplified by an electrical amplifier (denoted by EA1) with 30-dB gain and 12-GHz 3-dB bandwidth. The amplified electrical QPSK-modulated vector signal drives a phase modulator to generate photonic vector signal. The phase modulator has 3-dB bandwidth of ~20 GHz, the half-wave voltage $V_\pi$ of 2.4V and 4-dB insertion loss.

An example of the optical spectrum after PM is shown in FIG. 15(a), and the power of the light after the PM is about 9.18 dBm. In some embodiments, the two fourth-order sidebands as optical mm-wave carrier by a 1×4 WSS with a 10-GHz grid and 7-dB insertion loss can be used. These two fourth-order optical subcarriers have the same amplitude and carry phase information. The frequency of optical mm-wave carrier is 88 GHz, and the power of the mm-wave signal after WSS is −8.93 dBm. Then the mm-wave signal is amplified by an Erbium-doped fiber amplifier (EDFA), and the power of the mm-wave signal after EDFA is 8.55 dBm. The optical spectra of the mm-wave signal after EDFA are shown in FIG. 15(b).

Then the optical mm-wave vector signal is detected by a high-speed PD (90-GHz 3-dB bandwidth). The converted electrical mm-wave vector signal is amplified by EA2 with a narrowband bandwidth of 100 GHz centered at 90 GHz, 23-dB gain and 4-dBm saturation output power. Then the 88-GHz electrical mm-wave vector signals are sent into wireless link by a W-band horn antenna (HA). After 1-m wireless transmission, at the W-band receiver, the electrical mm-wave vector signal is received by another identical HA. The electrical mm-wave vector signal is down-converted into 4.5-GHz electrical IF signal in the analog domain by using an electrical mixer with the electrical LO, which is 83.5-GHz sinusoidal RF signals. The measured electrical spectrum centered on 4.5-GHz IF after analog-to-digital conversion is showed in FIG. 15(c). Then the electrical IF vector signal passes through a low-noise electrical amplifier (denoted by EA3). For experimentation, the 4.5-GHz IF vector signal is sampled by a digital oscilloscope (OSC) with 40-GSa/s sampling rate and 16-GHz electrical bandwidth. The captured data is then post-processed by advanced digital signal processing (DSP), which includes down conversion, constant modulus algorithm (CMA) equalization, residual frequency offset estimation (FOE) based on the 4-th power method, carrier phase estimation (CPE) based on the Viterbi-Viterbi method, differential decoding and bit-error-ratio (BER) calculation.

Figure 16:
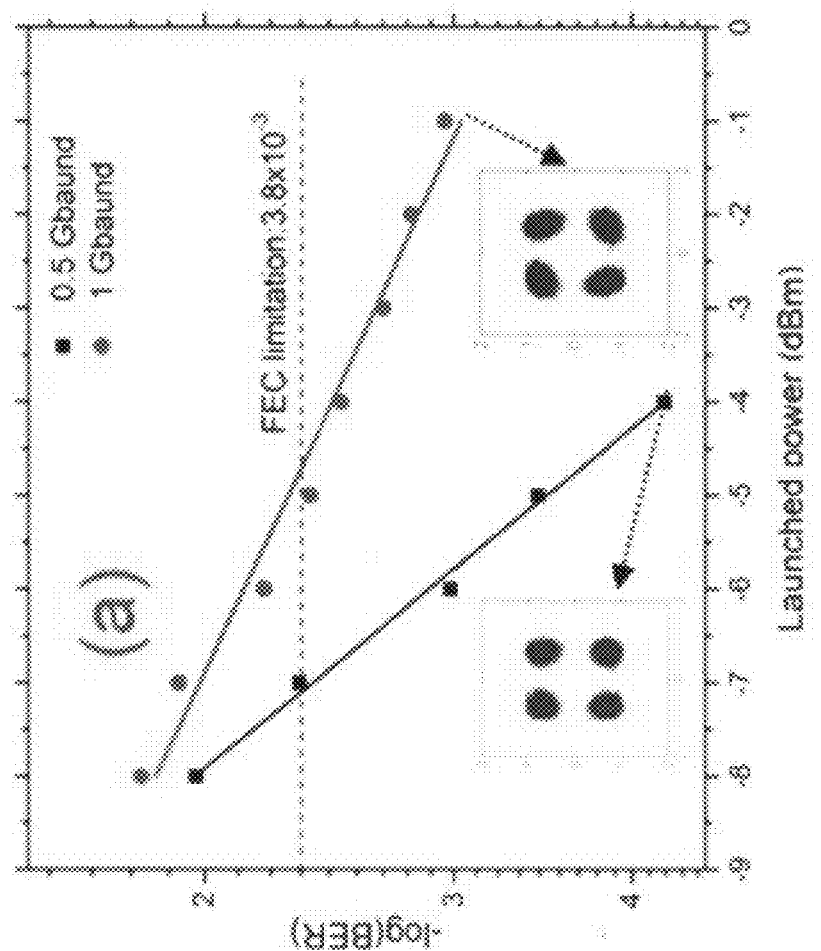
FIG. 16 shows an example (a) BER versus launched optical power.

FIG. 16 shows an example of BER versus the launched optical power into PD and the corresponding constellations with different transmission rates of 0.5 and 1 Gbaud after 1-m wireless delivery, respectively. The BER of the transmission system can reach the forward-error-correction (FEC) threshold of $3.8 \times 10^{-3}$. The BER performance for the 1-Gbaud QPSK-modulated vector signal is worse than that of the 0.5-Gbaud one, which is because of the limited bandwidth of the AWG and the WSS. If the bandwidth of AWG could be wider and filtering effect of the WSS could be smaller, the transmission system could transmit higher rate signals and have better BER performance. The AWG used in our experiment is Tektronix AWG7122C with about 5-GHz 3-dB bandwidth.

FIG. 16 shows an example (a) BER versus launched optical power.

Figure 17:
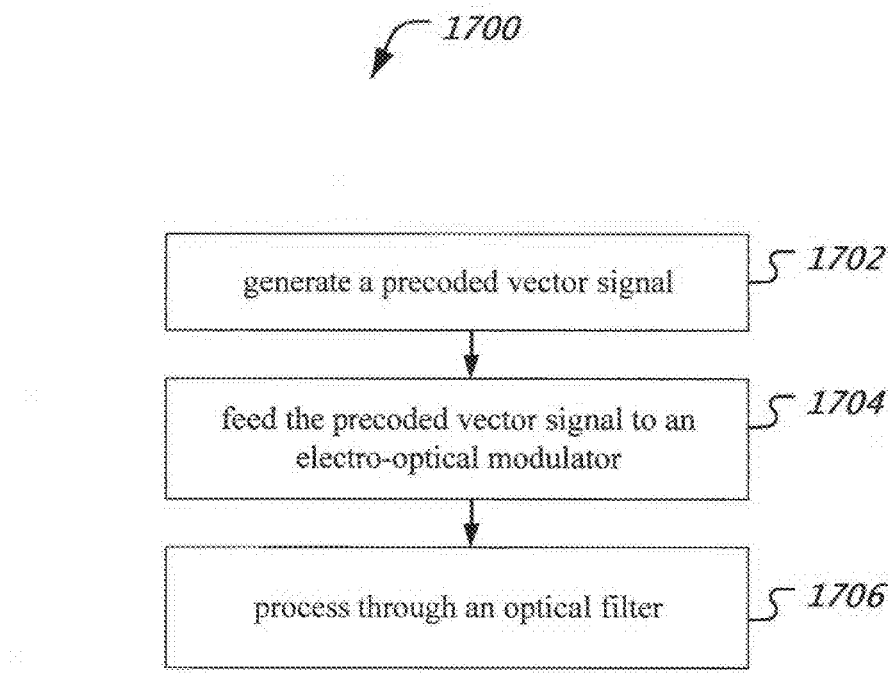
FIG. 17 shows an example optical signal transmission method.

FIG. 17 shows an example flowchart 1700 for generating an optical signal. The method 1700 of optical communication may be implemented at a transmitter in an optical communication network, e.g., at transmitter 702.

The method 1700 includes, at 1702, combining a first quadrature amplitude modulation (QAM) modulated signal carrying a first portion of data to be transmitted and a second QAM modulated signal carrying remaining portion of data to be transmitted to generate a precoded vector signal. The combining operation may be performed in the electrical domain using circuits for adding two signals to each other.

The method 1700 includes, at 1704, feeding the precoded vector to an electro-optical modulator in form of a photonic vector signal to produce an intermediate modulated optical signal. In some embodiments, the precoded vector can be both amplitude precoded and phase precoded.

The method 1700 includes, at 1706, processing the intermediate modulated optical signal through a wavelength selective switch (WSS) to generate a frequency multiplied optical signal for transmission. In some embodiments, frequency can be multiplied a factor of one of two-fold, four-fold, six-fold and eight-fold.

Figure 18:
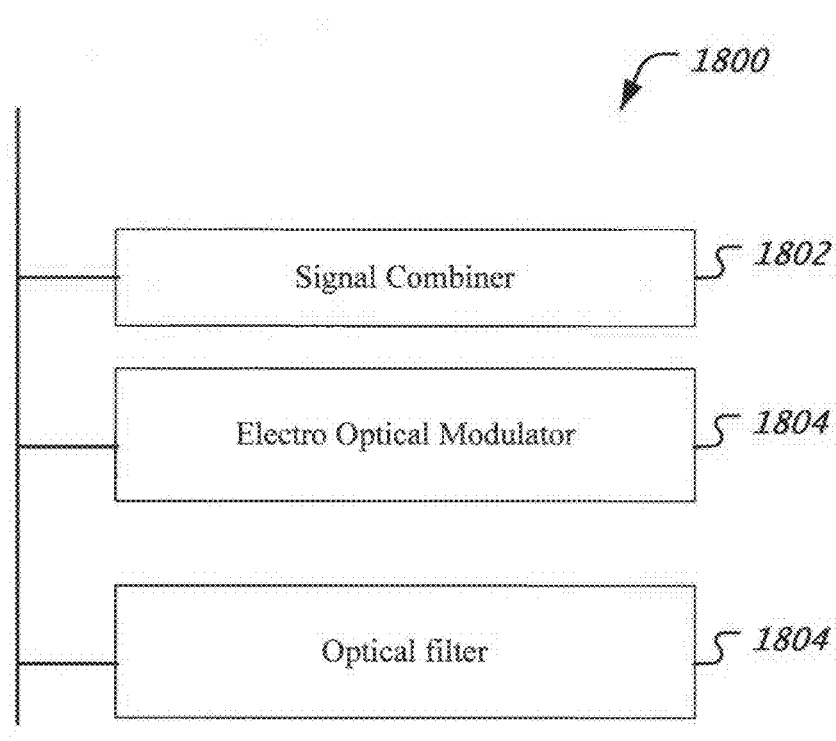
FIG. 18 shows an example optical communication receiver apparatus.

FIG. 18 shows an example optical transmission apparatus 1800. The optical transmission apparatus 1800 may be, e.g., includes in the apparatus 702.

The apparatus 1800 includes a signal combiner 1802 that combines a first quadrature amplitude modulation (QAM) modulated signal carrying a first portion of data to be transmitted and a second QAM modulated signal carrying remaining portion of data to be transmitted to generate a precoded vector signal. In various embodiments, the signal combiner may be implemented using additive circuits using Silicon or Gallium Arsenide semiconductor transistors and other suitable components. In some embodiments, the signals may be combined in the analog electrical domain. In some embodiments, the signals may be combined in the digital domain using arithmetic addition calculations.

The apparatus 1800 includes an electro-optical modulator 1804 that receives the precoded vector in form of a photonic vector signal to produce an intermediate modulated optical signal. An MZM modulator is one type of electro-optical modulator 1804. In some embodiments, the MZM modulator may be use synchronous coupling of energy between two signal travel paths. In various embodiments, MZM modulators may be implemented using different material, such as silicon, Gallium Arsenide, etc. In some embodiments, the MZM modulator may be operated at its maximum transmission point. Alternatively, in some embodiments, the MZM modulator may be operated at its minimum transmission point. In different embodiments, an MZM intensity modulator or an MZM phase modulator may be used.

The apparatus 1800 includes an optical filter, for example, a wavelength selective switch (WSS) 1806 that processes the intermediate modulated optical signal to generate a frequency multiplied optical signal for transmission. In various embodiments, other type of optical filters may be used in place of WSS. Such examples include a Fiber Bragg grating, a tunable optical filter or an arrayed waveguide grading or another optical filter found in the art. In various embodiments, the apparatus 1800 may further implemented additional techniques and implementations described herein.

It will be appreciated that several techniques have been disclosed herein for optical signals generation based on vector modulator using a single external modulator which may be an MZM modulator.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
    combining a first quadrature amplitude modulation (QAM) modulated signal carrying a first portion of data to be transmitted and a second QAM modulated signal carrying remaining portion of data to be transmitted to generate a precoded vector signal;
    feeding the precoded vector signal to an electro-optical modulator in form of a photonic vector signal to produce an intermediate modulated optical signal, wherein the intermediate modulated optical signal includes multiple optical subcarriers; and
    filtering the intermediate modulated optical signal through an optical filter configured to output for transmission, from the multiple optical subcarriers, two optical subcarriers of a same order and a predetermined frequency spacing.

2. The method of claim 1, wherein the electro-optical modulator is of a Mach-Zehnder modulator (MZM) type.

3. The method of claim 2, further including operating the MZM electro-optical modulator at a maximum transmission point.

4. The method of claim 2, further including operating the MZM electro-optical modulator at a minimum transmission point.

5. The method of claim 2, wherein the MZM electro-optical modulator includes one of an MZM intensity modulator and an MZM phase modulator.

6. The method of claim 1, wherein the electro-optical modulator is an external electro-optical modulator.

7. The method of claim 1, wherein the first QAM signal and the second QAM signal each comprise QAM constellation of size 8 or higher.

8. The method of claim 1, wherein the processing through the optical filter comprises frequency multiplication by a factor of one of two-fold, four-fold, six-fold and eight-fold.

9. The method of claim 1, wherein the precoded vector signal is both amplitude precoded and phase precoded.

10. The method of claim 1, wherein the optical filter comprises at least one of a wavelength selective switch (WSS), a Fiber Bragg Grating, a tunable optical filter and an arrayed waveguide grating.

11. The method of claim 1, wherein the predetermined frequency spacing is based on a transmission point of the electro-optical modulator.

12. An optical transmission apparatus, comprising:
    a signal combiner that combines a first quadrature amplitude modulation (QAM) modulated signal carrying a first portion of data to be transmitted and a second QAM modulated signal carrying remaining portion of data to be transmitted to generate a precoded vector signal;
    an electro-optical modulator that receives the precoded vector in form of a photonic vector signal to produce an intermediate modulated optical signal, wherein the intermediate modulated optical signal includes multiple optical subcarriers; and
    an optical filter that filters the intermediate modulated optical signal, the optical filter configured to output for transmission, from the multiple optical subcarriers, two optical subcarriers of a same order and a predetermined frequency spacing.

13. The apparatus of claim 12, wherein the electro-optical modulator is of a Mach-Zehnder modulator (MZM) type.

14. The apparatus of claim 13, wherein the MZM electro-optical modulator is operated at a maximum transmission point.

15. The apparatus of claim 13, wherein the MZM electro-optical modulator is operated at a minimum transmission point.

16. The apparatus of claim 13, wherein the MZM electro-optical modulator includes one of an MZM intensity modulator and an MZM phase modulator.

17. The apparatus of claim 12, wherein the electro-optical modulator is an external electro-optical modulator.

18. The apparatus of claim 12, wherein the first QAM signal and the second QAM signal comprise QAM constellation of size eight or higher.

19. The apparatus of claim 12, wherein the processing through the optical filter comprises frequency multiplication by a factor of one of two-fold, four-fold, six-fold and eight-fold.

20. The apparatus of claim 12, wherein the precoded vector signal is both amplitude precoded and phase precoded.

21. The apparatus of claim 12, wherein the optical filter comprises at least one of a wavelength selective switch (WSS), a Fiber Bragg Grating, a tunable optical filter and an arrayed waveguide grating.

22. The apparatus of claim 12, wherein the predetermined frequency spacing is based on a transmission point of the electro-optical modulator.

* * * * *